(12) United States Patent
Byun et al.

(10) Patent No.: US 10,491,053 B2
(45) Date of Patent: Nov. 26, 2019

(54) WIRELESS POWER TRANSMITTER, WIRELESS POWER RECEIVER AND CONTROL METHOD THEREOF

(71) Applicant: Samsung Electronics Co., Ltd., Gyeonggi-do (KR)

(72) Inventors: Kang-Ho Byun, Gyeonggi-do (KR); Kyung-Woo Lee, Seoul (KR); Ho-Seong Lee, Gyeonggi-do (KR); Hyuk-Choon Kwon, Seoul (KR); Soo-Yeon Jung, Seoul (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/058,582

(22) Filed: Aug. 8, 2018

(65) Prior Publication Data

US 2018/0375388 A1 Dec. 27, 2018

Related U.S. Application Data

(63) Continuation of application No. 14/265,861, filed on Apr. 30, 2014, now Pat. No. 10,069,348.

(30) Foreign Application Priority Data

May 3, 2013 (KR) ........................ 10-2013-0050296

(51) Int. Cl.
*H02J 50/80* (2016.01)
*H02J 7/02* (2016.01)
(Continued)

(52) U.S. Cl.
CPC ................ *H02J 50/80* (2016.02); *H02J 7/02* (2013.01); *H02J 7/025* (2013.01); *H02J 50/12* (2016.02);
(Continued)

(58) Field of Classification Search
CPC .. H02J 50/80; H02J 50/40; H02J 7/025; H02J 5/005; H02H 50/12
(Continued)

(56) References Cited

U.S. PATENT DOCUMENTS 8,412,963 B2 4/2013 Tsai
2010/0083012 A1 4/2010 Corbridge
(Continued)

FOREIGN PATENT DOCUMENTS

CN 101447683 6/2009
CN 102792554 11/2012
(Continued)

OTHER PUBLICATIONS

Korean Office Action dated Mar. 5, 2019 issued in counterpart application No. 10-2013-0050296, 9 pages.
(Continued)

*Primary Examiner* — Alfonso Perez Borroto
(74) *Attorney, Agent, or Firm* — The Farrell Law Firm, P.C.

(57) ABSTRACT

Disclosed is a control method for transmitting charging power to a wireless power receiver in a wireless power transmitter, wherein a connection request signal is transmitted to the wireless power receiver for forming a communication connection between the wireless power transmitter and the wireless power receiver, based on information about a characteristic of an advertisement signal transmitted to the wireless power transmitter, the advertisement signal including a handle value for a preset universally unique identifier, the wireless power receiver is registered to a wireless power network corresponding to the wireless power transmitter through the communication connection, and wireless charging power is transmitted to the wireless power receiver after registering the wireless power receiver.

24 Claims, 16 Drawing Sheets

(51) Int. Cl.
*H02J 50/12* (2016.01)
*H02J 50/40* (2016.01)
*H02J 50/60* (2016.01)
*H04B 5/00* (2006.01)
*H04W 76/14* (2018.01)
*H02J 7/00* (2006.01)
*H02J 5/00* (2016.01)

(52) U.S. Cl.
CPC .............. *H02J 50/40* (2016.02); *H02J 50/60* (2016.02); *H04B 5/0037* (2013.01); *H04B 5/0075* (2013.01); *H04W 76/14* (2018.02); *H02J 5/005* (2013.01); *H02J 2007/0096* (2013.01)

(58) Field of Classification Search
USPC ........................................................ 307/104
See application file for complete search history.

(56) References Cited

U.S. PATENT DOCUMENTS

| | | | |
|---|---|---|---|
| 2011/0018359 A1* | 1/2011 | Wada ................. | H02J 5/005 307/104 |
| 2011/0018679 A1 | 1/2011 | Davis et al. | |
| 2011/0062914 A1 | 3/2011 | Park et al. | |
| 2011/0115430 A1 | 5/2011 | Saunamaki | |
| 2011/0133569 A1* | 6/2011 | Cheon ................. | H02J 17/00 307/104 |
| 2012/0080957 A1* | 4/2012 | Cooper ............... | H02J 5/005 307/104 |
| 2012/0139358 A1* | 6/2012 | Teggatz .............. | H01F 38/14 307/104 |
| 2012/0153739 A1* | 6/2012 | Cooper ............... | H02J 5/005 307/104 |
| 2012/0161529 A1* | 6/2012 | Kamata ............... | H02J 5/005 307/99 |
| 2012/0163619 A1 | 6/2012 | Kinoshita et al. | |
| 2012/0213134 A1 | 8/2012 | Woo et al. | |
| 2012/0223590 A1 | 9/2012 | Low et al. | |
| 2013/0002191 A1 | 1/2013 | Jung et al. | |
| 2013/0063082 A1 | 3/2013 | Lee et al. | |
| 2013/0082652 A1 | 4/2013 | Jung | |
| 2013/0234661 A1 | 9/2013 | Yang | |
| 2013/0257364 A1 | 10/2013 | Redding | |

FOREIGN PATENT DOCUMENTS

| | | |
|---|---|---|
| CN | 102882241 | 1/2013 |
| JP | 2012-147417 | 8/2012 |
| KR | 1020110029734 | 3/2011 |
| KR | 1020120068412 | 6/2012 |
| KR | 1020130028011 | 3/2013 |
| KR | 1020130036502 | 4/2013 |
| WO | WO 2012/081858 | 6/2012 |

OTHER PUBLICATIONS

Chris Warner, "Wireless Charging: An Interview with the Alliance for Wireless Power", XP-002733067, Jan. 5, 2013.
Bluetooth Specification Version 4.0—Attribute Protocol (ATT), Core System Package (Host volume) Part F, XP-002733068, Jun. 30, 2010.
Bluetooth Specification Version 4.0—Generic Attribute Protocol (GATT), Core System Package (Host volume) Part G, XP-002733069, Jun. 30, 2010.
European Search Report dated Dec. 10, 2014 issued in counterpart application No. 14166667.7-1505.
Chinese Office Action dated May 15, 2017 issued in counterpart application No. 201480025324.9, 14 pages.

* cited by examiner

WIRELESS POWER TRANSMITTER, WIRELESS POWER RECEIVER AND CONTROL METHOD THEREOF

PRIORITY

This application is a Continuation Application of U.S. patent application Ser. No. 14/265,861, filed on Apr. 30, 2014, and claims priority under 35 U.S.C. § 119(a) to a Korean Patent Application filed in the Korean Intellectual Property Office on May 3, 2013 and assigned Serial No. 10-2013-0050296, the content of each of which is incorporated herein by reference.

BACKGROUND OF THE INVENTION

1. Field of the Invention

The present invention relates generally to a wireless power transmitter, a wireless power receiver and a control method thereof, and more particularly, to a wireless power transmitter capable of wirelessly transmitting charging power, a wireless power receiver capable of wirelessly receiving charging power, and a control method thereof.

2. Description of the Related Art

Mobile terminals such as cellular phones and Personal Digital Assistants (PDAs) are powered by a rechargeable battery due to their portability. In order to charge the battery, electrical energy may be supplied to the battery of the mobile terminal using a separate charging device. Typically, the charging device and the battery have separate contact terminals mounted on their exposed surfaces, and the charging device and the battery may be electrically connected by causing their contact terminals to be in contact with each other.

However, this contact type charging scheme is subject to contamination due to foreign matter since the contact terminals are exposed to the outside, so the battery charging may not be correctly performed. The battery also may not be correctly charged when the contact terminals are exposed to moisture.

In order to solve these and other problems, wireless or non-contact charging technology has recently been developed and utilized in many electronic devices.

The wireless charging technology, which is based on wireless power transmission/reception, may ensure a system in which a battery may be automatically charged by simply putting, for example, a cellular phone on a charging pad without connecting the cellular phone to a separate charging connector. Typically, wireless electronic toothbrushes or cordless electric shavers are well known as devices employing the wireless charging technology. The wireless charging technology improves the waterproof performance of electronic products by wirelessly charging the electronic products, and ensures the portability of electronic devices because of the unnecessity of a wired charger. In the coming era of electric vehicles, the related technologies are expected to significantly evolve.

The wireless charging technology may be roughly classified into a coil-based electromagnetic induction scheme, a resonance scheme, and Radio Frequency (RF)/micro wave radiation scheme that converts electrical energy into microwaves and transfers the microwaves.

Up to now, the electromagnetic induction scheme has been widely used. However, as experiments of wirelessly transmitting power from a distance of tens of meters using microwaves have been recently successful at home and abroad, it seems that all electronic products may be wirelessly charged without wires anytime and anyplace in the near future.

The electromagnetic induction-based power transmission method corresponds to a scheme of transmitting power between a primary coil and a secondary coil. If a magnet moves around a coil, an induced current may be generated. Based on this principle, a transmitter generates a magnetic field, and a current may be induced in a receiver due to a change in the magnetic field, creating energy. This phenomenon is called an electromagnetic induction phenomenon, and a power transmission method employing this phenomenon is excellent in energy transmission efficiency.

As for the resonance scheme, electricity is wirelessly transferred by using the resonance-based power transmission principle as a coupled mode theory even if an electronic device is apart from a charging device several meters. In the wireless charging system, electromagnetic waves containing electrical energy resonate, and the resonating electrical energy is directly transferred only to an electronic device having the resonant frequency, and the unused electrical energy is reabsorbed as an electromagnetic field instead of spreading in the air, so the resonating electrical energy, unlike other electromagnetic waves, may not affect the nearby devices or human bodies.

Although a good deal of research has recently been conducted on the wireless charging scheme, no standards have been proposed for wireless charging priority, search for a wireless power transmitter and a wireless power receiver, selection of a frequency for communication between a wireless power transmitter and a wireless power receiver, adjustment of wireless power, selection of a matching circuit, distribution of communication time for each wireless power receiver in one charging cycle, and the like. In particular, there is a need for a proposed standard for the configuration and procedure in which a wireless power receiver selects a wireless power transmitter from which the wireless power receiver will receive wireless power.

In particular, there is a need to develop a method in which a wireless power transmitter receives a stack that is based on a predetermined communication scheme, from a wireless power receiver.

SUMMARY OF THE INVENTION

An aspect of the present invention is to address at least the above-mentioned problems and/or disadvantages and to provide at least the advantages described below. Accordingly, an aspect of the present invention is to provide a method in which a wireless power transmitter receives a stack that is based on a predetermined communication scheme, from a wireless power receiver.

In accordance with an aspect of the present invention, there is provided a control method for transmitting charging power to a wireless power receiver in a wireless power transmitter, including applying beacon power for detecting the wireless power receiver into a resonator of the wireless power transmitter, in response to detecting a change of a load impedance of the resonator while applying the beacon power, applying driving power into the resonator, wherein the wireless power receiver transmits an advertisement signal to the wireless power transmitter by using at least part of the driving power wirelessly received from the wireless power transmitter, receiving the advertisement signal from the wireless power receiver, the advertisement signal including a handle value for a preset universally unique identifier (UUID), obtaining information about a characteristic of the advertisement signal, wherein the handle value is assigned to the characteristic, transmitting a connection request signal to the wireless power receiver for forming a communication connection between the wireless power transmitter and the wireless power receiver, based on the information, registering the wireless power receiver to a wireless power network corresponding to the wireless power transmitter through the communication connection, and transmitting wireless charging power to the wireless power receiver after registering the wireless power receiver.

In accordance with another aspect of the present invention, there is provided a control method for receiving charging power from a wireless power transmitter in a wireless power receiver, including receiving driving power into a resonator of the wireless power receiver, wherein the wireless power receiver transmits an advertisement signal to the wireless power transmitter by using at least part of the driving power wirelessly received from the wireless power transmitter, transmitting the advertisement signal to the wireless power transmitter, the advertisement signal including a handle value related to a preset UUID for the wireless power transmitter, obtaining information about a characteristic of the advertisement signal, wherein the handle value is assigned to the characteristic, receiving a communication connection request signal from the wireless power transmitter, forming a communication connection between the wireless power transmitter and the wireless power receiver, based on the communication connection request signal, joining a wireless power network corresponding to the wireless power transmitter through the communication connection, and receiving wireless charging power from the wireless power transmitter after joining the wireless power network.

In accordance with another aspect of the present invention, there is provided a wireless power transmitter for transmitting charging power to a wireless power receiver, the wireless power transmitter including a communication unit, and a controller configured to apply beacon power for detecting the wireless power receiver into a resonator of the wireless power transmitter, in response to detecting a change of a load impedance of the resonator while applying the beacon power, apply driving power into the resonator, wherein the wireless power receiver transmits an advertisement signal to the wireless power transmitter by using at least part of the driving power wirelessly received from the wireless power transmitter, receive, using the communication unit, the advertisement signal from the wireless power receiver, the advertisement signal including a handle value for a preset UUID, obtain information about a characteristic of the advertisement signal, wherein the handle value is assigned to the characteristic, transmit, using the communication unit, a connection request signal to the wireless power receiver for forming a communication connection between the wireless power transmitter and the wireless power receiver, based on the information, register the wireless power receiver to a wireless power network corresponding to the wireless power transmitter through the communication connection; and transmit wireless charging power to the wireless power receiver after registering the wireless power receiver.

In accordance with another aspect of the present invention, there is provided a wireless power transmitter for transmitting charging power to a wireless power receiver, the wireless power transmitter including a communication unit, and a controller configured to apply beacon power for detecting the wireless power receiver into a resonator of the wireless power transmitter, in response to detecting a change of a load impedance of the resonator while applying the beacon power, apply driving power into the resonator, wherein the wireless power receiver transmits an advertisement signal to the wireless power transmitter by using at least part of the driving power wirelessly received from the wireless power transmitter, receive, using the communication unit, the advertisement signal from the wireless power receiver, the advertisement signal including a handle value for a preset UUID, obtain information about a characteristic of the advertisement signal, wherein the handle value is assigned to the characteristic, transmit, using the communication unit, a connection request signal to the wireless power receiver for forming a communication connection between the wireless power transmitter and the wireless power receiver, based on the information, register the wireless power receiver to a wireless power network corresponding to the wireless power transmitter through the communication connection, and transmit wireless charging power to the wireless power receiver after registering the wireless power receiver.

In accordance with another aspect of the present invention, there is provided a wireless power receiver for receiving charging power from a wireless power transmitter, wireless power receiver including a communication unit, and a controller configured to receive driving power into a resonator of the wireless power receiver, wherein the wireless power receiver transmits an advertisement signal to the wireless power transmitter by using at least part of the driving power wirelessly received from the wireless power transmitter, transmit, using the communication unit, the advertisement signal to the wireless power transmitter, the advertisement signal including a handle value related to a preset UUID for the wireless power transmitter, obtain information about a characteristic of the advertisement signal, wherein the handle value is assigned to the characteristic, receive, using the communication unit, a communication connection request signal from the wireless power transmitter, form a communication connection between the wireless power transmitter and the wireless power receiver, based on the communication connection request signal, join a wireless power network corresponding to the wireless power transmitter through the communication connection, and receive wireless charging power from the wireless power transmitter after joining the wireless power network.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their dictionary meanings, but, are merely used to enable a clear and consistent understanding of the invention. Accordingly, it should be apparent to those skilled in the art that the following description of embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
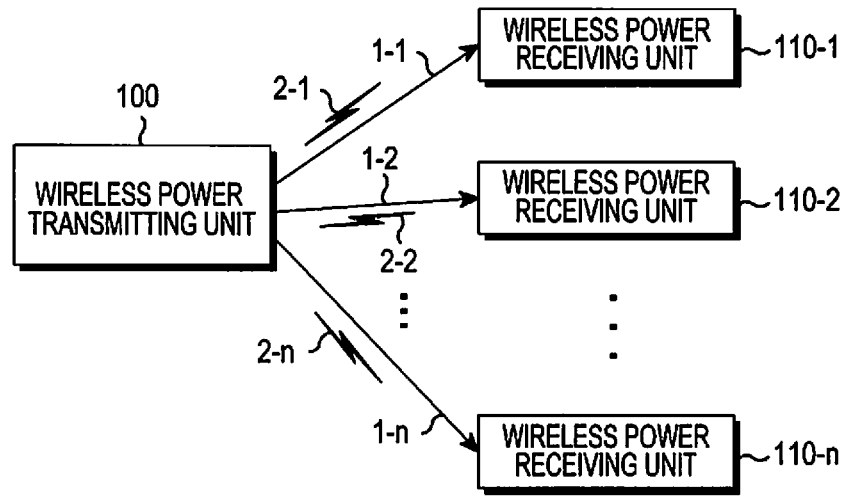
FIG. 1 illustrates the concept of the overall operation of a wireless charging system.

FIG. 1 illustrates the concept of the overall operation of a wireless charging system. As illustrated in FIG. 1, the wireless charging system includes a wireless power transmitting unit 100 and at least one wireless power receiving unit 110-1, 110-2 and 110-*n*.

The wireless power transmitter 100 wirelessly transmits power 1-1, 1-2 and 1-*n* to the at least one wireless power receiver 110-1, 110-2 and 110-*n*, respectively. More specifically, the wireless power transmitter 100 may wirelessly transmit the power 1-1, 1-2 and 1-*n* only to the wireless power receiver(s) that is authenticated by performing a predetermined authentication procedure.

The wireless power transmitter 100 forms an electrical connection to the wireless power receivers 110-1, 110-2 and 110-*n*. For example, the wireless power transmitter 100 may transmit wireless power in the form of electromagnetic waves to the wireless power receivers 110-1, 110-2 and 110-*n*.

The wireless power transmitter 100 may perform bi-directional communication with the wireless power receivers 110-1, 110-2 and 110-*n*. The wireless power transmitter 100 and the wireless power receivers 110-1, 110-2 and 110-*n* may process or transmit/receive packets 2-1, 2-2 and 2-*n*, which are configured in a predetermined frame. The frame will be described in detail below. The wireless power receiver may be implemented as, for example, a mobile communication terminal, a Personal Digital Assistant (PDA), a Personal Multimedia Player (PMP), a smart phone, and the like.

The wireless power transmitter 100 may wirelessly supply power to the plurality of wireless power receivers 110-1, 110-2 and 110-*n*. For example, the wireless power transmitter 100 may transmit power to the plurality of wireless power receivers 110-1, 110-2 and 110-*n* using the resonance scheme. If the wireless power transmitter 100 adopts the resonance scheme, the distance between the wireless power transmitter 100 and the plurality of wireless power receivers 110-1, 110-2 and 110-*n* is preferably less than 30 m. If the wireless power transmitter 100 adopts the electromagnetic induction scheme, the distance between the wireless power transmitter 100 and the plurality of wireless power receivers 110-1, 110-2 and 110-*n* is preferably less than 10 cm.

The wireless power receivers 110-1, 110-2 and 110-*n* receive wireless power from the wireless power transmitter 100, and charge batteries mounted therein with the received power. The wireless power receivers 110-1, 110-2 and 110-*n* may transmit, to the wireless power transmitter 100, a signal for requesting transmission of wireless power, information needed for reception of wireless power, status information of the wireless power receiver, information for control of the wireless power transmitter 100, and the like. The transmission signal information will be described in detail below.

The wireless power receivers 110-1, 110-2 and 110-*n* may send a message indicating their charging status to the wireless power transmitter 100.

The wireless power transmitter 100 may include a display means such as a display, and displays the status of each of the wireless power receivers 110-1, 110-2 and 110-*n* on the display unit based on a message received from each of the wireless power receivers 110-1, 110-2 and 110-*n*. In addition, the wireless power transmitter 100 may display, on the display unit, the time that is expected until each of the wireless power receivers 110-1, 110-2 and 110-*n* is fully charged.

The wireless power transmitter 100 may transmit a control signal for disabling the wireless charging function to each of the wireless power receivers 110-1, 110-2 and 110-*n*. Upon receiving the control signal for disabling the wireless charging function from the wireless power transmitter 100, the wireless power receiver disables the wireless charging function.

Figure 2:
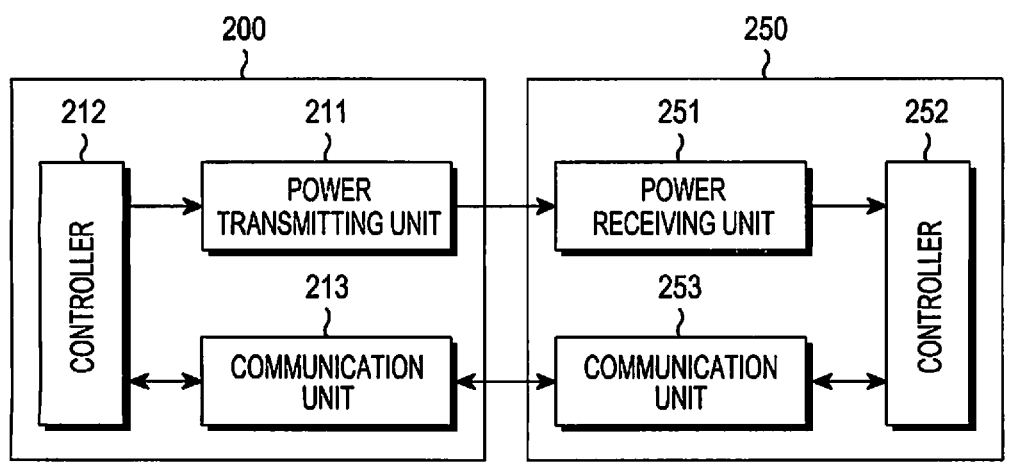
FIG. 2 is a block diagram of a wireless power transmitter and a wireless power receiver according to an embodiment of the present invention.

FIG. 2 is a block diagram of a wireless power transmitter and a wireless power receiver according to an embodiment of the present disclosure.

As illustrated in FIG. 2, a wireless power transmitter 200 includes a power transmitting unit 211, a controller 212, and a communication unit 213. A wireless power receiver 250 includes a power receiving unit 251, a controller 252 and a communication unit 253.

The power transmitting unit 211 supplies the power required by the wireless power transmitter 200, and wirelessly supplies the power to the wireless power receiver 250. The power transmitting unit 211 may supply power in the form of an Alternating Current (AC) waveform, or may supply power in the form of Direct Current (DC) waveform. In the latter case, the power transmitting unit 211 converts the DC waveform into an AC waveform using an inverter, and supplies the power in the form of AC waveform. The power transmitting unit 211 may be implemented in the form of built-in battery, or may be implemented in the form of power receiving interface to receive power from the outside and supply the received power to other components. It will be apparent to those of ordinary skill in the art that any means may replace the power transmitting unit 211 as long as it can supply power in the form of predetermined AC waveform.

In addition, the power transmitting unit 211 may provide AC waveforms to the wireless power receiver 250 in the form of electromagnetic waves. The power transmitting unit 211 may further include a resonance circuit, so the power transmitting unit 211 may transmit or receive predetermined electromagnetic waves. If the power transmitting unit 211 is implemented with a resonance circuit, an inductance L of a loop coil in the resonance circuit may be subject to change. It will be apparent to those of ordinary skill in the art that any means may replace the power transmitting unit 211 as long as it can transmit and receive electromagnetic waves.

The controller 212 controls the overall operation of the wireless power transmitter 200. The controller 212 may control the overall operation of the wireless power transmitter 200 using an algorithm, a program or an application, each of which is read from a storage and required for the control. The controller 212 may be implemented in the form of a Central Processing Unit (CPU), a microprocessor, a minicomputer, and the like. A detailed operation of the controller 212 will be described in more detail below.

The communication unit 213 performs communication with the wireless power receiver 250 using a predetermined communication scheme. The communication unit 213 may perform communication with the communication unit 253 of the wireless power receiver 250, using Near Field Communication (NFC), Zigbee, Infrared Data Association (IrDA), Visible Light Communication (VLC), Bluetooth, Bluetooth Low Energy (BLE), and the like. The communication unit 213 may employ a Carrier Sense Multiple Access with Collision Avoidance (CSMA/CA) algorithm. The above communication schemes are merely illustrative, and the scope of the present invention is not limited to a specific communication scheme performed in the communication unit 213.

The communication unit 213 transmits a signal for information about the wireless power transmitter 200. The communication unit 213 may unicast, multicast, or broadcast the signal. Table 1 below illustrates a data structure of a signal transmitted from the wireless power transmitter 200 according to an embodiment of the present invention. The wireless power transmitter 200 may transmit a signal having the following frame at a preset cycle, and the signal may be called herein a 'Notice' signal.

TABLE 1

| frame type | protocol version | sequence number | network ID | RX to Report (schedule mask) | Reserved | Number of Rx |
|---|---|---|---|---|---|---|
| Notice | 4 bit | 1 Byte | 1 Byte | 1 Byte | 5 bit | 3 bit |

In Table 1, a 'frame type' field, which is a field indicating a type of the signal, indicates that the signal is a 'Notice' signal. A 'protocol version' field, which is a field indicating a protocol type of a communication scheme, may be allocated, for example, 4 bits. A 'sequence number' field, which is a field indicating a sequence number of the signal, may be allocated, for example, 1 byte. The sequence number may increase one by one in response to, for example, a signal transmission/reception phase. A 'network ID' field, which is a field indicating a network ID of the wireless power transmitter 200, may be allocated, for example, 1 byte. A 'Rx to Report (schedule mask)' field, which is a field indicating the wireless power receivers that will make a report to the wireless power transmitter 200, may be allocated, for example, 1 byte. Table 2 below illustrates the 'Rx to Report (schedule mask)' field according to an embodiment of the present invention.

TABLE 2

| Rx to Report (schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

In Table 2, Rx1 to Rx8 may correspond to first to eighth wireless power receivers. The 'Rx to Report (schedule mask)' field may be implemented to cause a wireless power receiver with a schedule mask number=1 to make a report.

In Table 1, a 'Reserved' field, which is a reserved field for future use, may be allocated, for example, 5 bits. A 'Number of Rx' field, which is a field indicating the number of wireless power receivers around the wireless power transmitter 200, may be allocated, for example, 3 bits.

The communication unit 213 receives power information from the wireless power receiver 250. The power information may include at least one of the capacity, battery level, the number of charging, usage, battery capacity and battery percentage of the wireless power receiver 250.

The communication unit 213 transmits a charging function control signal for controlling the charging function of the wireless power receiver 250. The charging function control signal is a control signal for enabling or disabling the charging function by controlling the power receiving unit 251 of the wireless power receiver 250. More specifically, the power information may include information about insertion of a wired charging terminal, transition from a Stand Alone (SA) mode to a Non Stand Alone (NSA) mode, and release of error situations, all of which will be described below.

The communication unit 213 receives not only the signal from the wireless power receiver 250, but also a signal from another wireless power transmitter (not shown). For example, the communication unit 213 may receive the 'Notice' signal of the frame in Table 1 from another wireless power transmitter.

Although the power transmitting unit 211 and the communication unit 213 are configured as different hardware components in FIG. 2, so the wireless power transmitter 200 seems to communicate in an out-band way, this is merely illustrative. In the present invention, the power transmitting unit 211 and the communication unit 213 may be implemented as a single hardware component, so the wireless power transmitter 200 may perform communication in an in-band way.

The wireless power transmitter 200 may transmit and receive a variety of signals to/from the wireless power receiver 250. Accordingly, a process in which the wireless power receiver 250 joins the wireless power network managed by the wireless power transmitter 200 and a process in which the wireless power receiver 250 is charged through wireless power transmission/reception may be performed, and a detailed description thereof will be given below.

Figure 3:
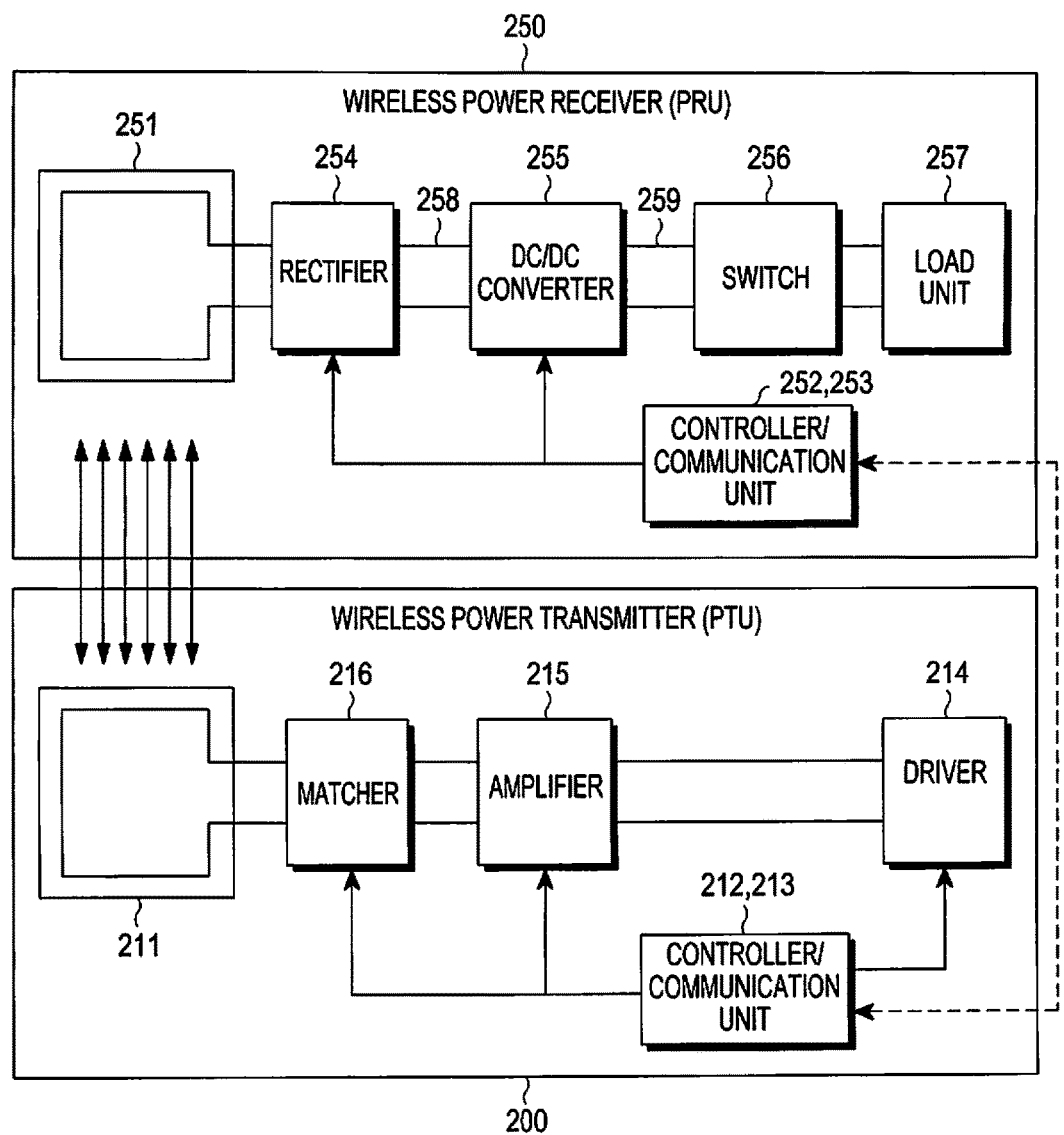
FIG. 3 is a detailed block diagram of a wireless power transmitter and a wireless power receiver according to an embodiment of the present invention.

FIG. 3 is a detailed block diagram of a wireless power transmitter and a wireless power receiver according to an embodiment of the present invention.

As illustrated in FIG. 3, the wireless power transmitter (or Power Transmission Unit (PTU)) 200 includes the power transmitting unit 211, a controller/communication unit 212/213, a driver 214, an amplifier 215, and a matcher 216. The wireless power receiver (or Power Reception Unit (PRU)) 250 includes the power receiving unit 251, a controller/communication unit 252/253, a rectifier 254, a DC/DC converter 255, a switch 256, and a load unit 257.

The driver 214 outputs DC power having a preset voltage value. The voltage value of the DC power output from the driver 214 is controlled by the controller/communication unit 212/213.

A DC current output from the driver 214 is output to the amplifier 215. The amplifier 215 amplifies the DC current with a preset gain. In addition, the amplifier 215 converts the DC current into an AC current based on the signal received from the controller/communication unit 212/213. Accordingly, the amplifier 215 outputs an AC current.

The matcher 216 performs impedance matching. For example, the matcher 216 adjusts the impedance seen from the matcher 216 to control the output power to have high efficiency and high power. The matcher 216 adjusts the impedance under control of the controller/communication unit 212/213. The matcher 216 may include at least one of a coil and a capacitor. The controller/communication unit 212/213 controls a connection status to at least one of the coil and the capacitor, and performs impedance matching according thereto.

The power transmitting unit 211 transmits the input AC power to the power receiving unit 251. Each of the power transmitting unit 211 and the power receiving unit 251 may be implemented with a resonance circuit having the same resonant frequency. For example, the resonant frequency may be determined as 6.78 MHz.

The controller/communication unit 212/213 performs communication with the controller/communication unit 252/253 in the wireless power receiver 250, and may perform, for example, bi-directional communication at a frequency of 2.4 GHz.

The power receiving unit 251 receives charging power.

The rectifier 254 rectifies the wireless power received at the power receiving unit 251 into DC power, and may be implemented in the form of, for example, a bridge diode. The DC/DC converter 255 converts the rectified power with a preset gain. For example, the DC/DC converter 255 may convert the rectified power so that its output terminal 259 may have a voltage of 5V. The minimum value and maximum value of a voltage applicable to a front end 258 of the DC/DC converter 255 may be set in advance.

The switch 256 connects the DC/DC converter 255 to the load unit 257. The switch 256 maintains the ON/OFF status under control of the controller 252. If the switch 256 is in an ON status, the load unit 257 may store the converted power received from the DC/DC converter 255.

Figure 4:
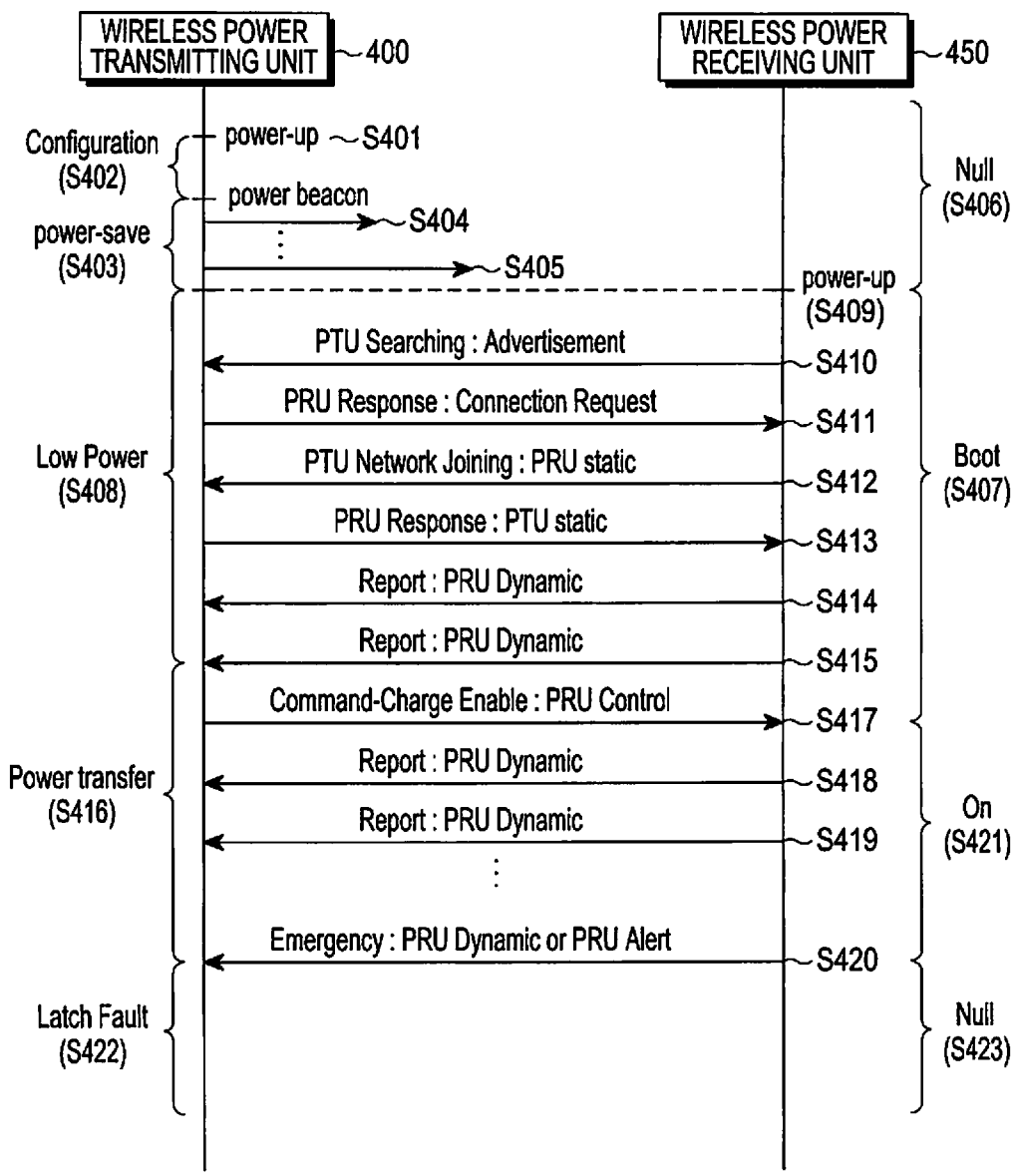
FIG. 4 is a flow diagram illustrating operations of a wireless power transmitter and a wireless power receiver according to an embodiment of the present invention.

FIG. 4 is a flow diagram illustrating operations of a wireless power transmitter and a wireless power receiver according to an embodiment of the present invention.

As illustrated in FIG. 4, a wireless power transmitter (or PTU) 400 is powered up in step S401. Upon power up, the wireless power transmitter 400 configures (or sets) the environment in step S402.

The wireless power transmitter 400 enters a power save mode in step S403. In the power save mode, the wireless power transmitter 400 applies different detection-purpose power beacons at their own cycles, and a detailed description thereof will be given with reference to FIG. 6. For example, as in FIG. 4, the wireless power transmitter 400 may apply detection-purpose power beacons S404 and S405, and the detection-purpose power beacons S404 and S405 may be different from each other in magnitude of a power value. All or some of the detection-purpose power beacons S404 and S405 may have the power that can drive a communication unit of a wireless power receiver (or PRU) 450. For example, the wireless power receiver 450 performs communication with the wireless power transmitter 400 by driving its communication unit by means of all or some of the detection-purpose power beacons S404 and S405. The above status may be referred to as a null status S406.

The wireless power transmitter 400 detects a change in load, which is caused by the arrangement of the wireless power receiver 450. The wireless power transmitter 400 enters a low power mode in step S408. The low power mode may also be described in detail with reference to FIG. 6. The wireless power receiver 450 drives its communication unit based on the power received from the wireless power transmitter 400 in step S409.

The wireless power receiver 450 transmits a PTU searching signal to the wireless power transmitter 400 in step S410. The wireless power receiver 450 transmits the PTU searching signal as an Advertisement signal that is based on Bluetooth Low Energy (BLE). The wireless power receiver 450 may periodically transmit the PTU searching signal and receive a response signal from the wireless power transmitter 400, or may transmit the PTU searching signal until a preset time is reached.

Upon receiving the PTU searching signal from the wireless power receiver 450, the wireless power transmitter 400 transmits a PRU Response signal in step S411. The response signal may be used to form a connection between the wireless power transmitter 400 and the wireless power receiver 450.

The wireless power receiver 450 transmits a PRU static signal in step S412. The PRU static signal may be a signal indicating a status of the wireless power receiver 450, and may be used to request join in the wireless power network managed by the wireless power transmitter 400.

The wireless power transmitter 400 transmits a PTU static signal in step S413. The PTU static signal transmitted by the wireless power transmitter 400 may be a signal indicating the capability of the wireless power transmitter 400.

If the wireless power transmitter 400 and the wireless power receiver 450 exchange the PRU static signal and the PTU static signal with each other, the wireless power receiver 450 periodically transmits a PRU Dynamic signal in steps S414 and S415. The PRU Dynamic signal may include information about at least one parameter measured in the wireless power receiver 450. For example, the PRU Dynamic signal may include information about a voltage at a rear end of a rectifier in the wireless power receiver 450. The above status of the wireless power receiver 450 may be referred to as a boot status S407.

The wireless power transmitter 400 enters a power transfer mode in step S416, and the wireless power transmitter 400 transmits a PRU control signal, which is a command signal for enabling the wireless power receiver 450 to perform charging, in step S417. In the power transfer mode, the wireless power transmitter 400 transmits charging power.

The PRU control signal transmitted by the wireless power transmitter 400 may include information for enabling/disabling the charging of the wireless power receiver 450, and information for permitting the charging of the wireless power receiver 450. The PRU control signal may be transmitted if the wireless power transmitter 400 commands to change the status of the wireless power receiver 450, or may be transmitted at a preset cycle of, for example, 250 ms. The wireless power receiver 450 may change the configuration according to the PRU control signal, and transmits a PRU Dynamic signal for reporting the status of the wireless power receiver 450 in steps S418 and S419. The PRU Dynamic signal transmitted by the wireless power receiver 450 may include information about at least one of voltage, current, PRU status, and temperature. The above status of the wireless power receiver 450 may be referred to as an ON status S421.

The PRU Dynamic signal may have a data structure as illustrated in Table 3.

TABLE 3

| Field | octets | description | use | units |
|---|---|---|---|---|
| optional fields | 1 | defines which optional fields are populated | mandatory | |
| Vrect | 2 | voltage at diode output | mandatory | mV |
| Irect | 2 | current at diode output | mandatory | mA |
| Vout | 2 | voltage at charge/battery port | optional | mV |
| Iout | 2 | current at charge/battery port | optional | mA |
| temperature | 1 | temperature of PRU | optional | Deg C. from −40 C. |

TABLE 3-continued

| Field | octets | description | use | units |
|---|---|---|---|---|
| Vrect min dyn | 2 | Vrect low limit (dynamic value) | optional | mV |
| Vrect set dyn | 2 | desired Vrect (dynamic value) | optional | mV |
| Vrect high dyn | 2 | Vrect high limit (dynamic value) | optional | mV |
| PRU alert | 1 | warnings | mandatory | Bit field |
| RFU | 3 | undefined | | |

The PRU Dynamic signal, as illustrated in Table 3, may include at least one of information about optional fields, information about a voltage at a rear end of a rectifier of the wireless power receiver, information about a current at the rear end of the rectifier of the wireless power receiver, information about a voltage at a rear end of a DC/DC converter of the wireless power receiver, information about a current at the rear end of the DC/DC converter of the wireless power receiver, temperature information, information about the minimum voltage at the rear end of the rectifier of the wireless power receiver, information about the optimal voltage at the rear end of the rectifier of the wireless power receiver, information about the maximum voltage at the rear end of the rectifier of the wireless power receiver, alert information (PRU alert), and a field reserved for future use (RFU).

The alert information may be formed in a data structure as illustrated in Table 4.

TABLE 4

| 7 | 6 | 5 | 4 | 3 | 2 | 1 | 0 |
|---|---|---|---|---|---|---|---|
| over voltage | over current | over temperature | charge complete | TA detect | transition | restart request | RFU |

The alert information may include, as illustrated in Table 4, fields such as 'over voltage' information, 'over current' information, 'over temperature' information, 'charge complete' information, 'TA detect' information (for detecting insertion of a wired charging terminal (or Travel Adapter (TA) terminal)), 'transition' information (for transition between the SA mode and the NSA mode), 'restart request' information and the like.

The wireless power receiver 450 performs charging by receiving a PRU control signal. For example, if the wireless power transmitter 400 has enough power to charge the wireless power receiver 450, the wireless power transmitter 400 transmits a PRU control signal for enabling the charging. The PRU control signal may be transmitted every time the charging status is changed. The PRU control signal may be transmitted every 250 ms for example, or may be transmitted when there is a change in parameter. The PRU control signal may be set such that the PRU control signal should be transmitted within a preset threshold time (e.g., one second) even though there is no change in parameter.

Referring back to FIG. 4, the wireless power receiver 450 may detect occurrence of an error. The wireless power receiver 450 transmits an alert signal to the wireless power transmitter 400 in step S420. The alert signal may be transmitted as a PRU Dynamic signal, or may be transmitted as a PRU alert signal. For example, the wireless power receiver 450 may reflect the error situations in the PRU alert field in Table 3, and transmit the results to the wireless power transmitter 400. Alternatively, the wireless power receiver 450 may transmit a single alert signal (e.g., PRU alert signal) indicating the error situations to the wireless power transmitter 400. Upon receiving the alert signal, the wireless power transmitter 400 enters a latch fault mode in step S422. The wireless power receiver 450 enters a null status in step S423.

Figure 5:
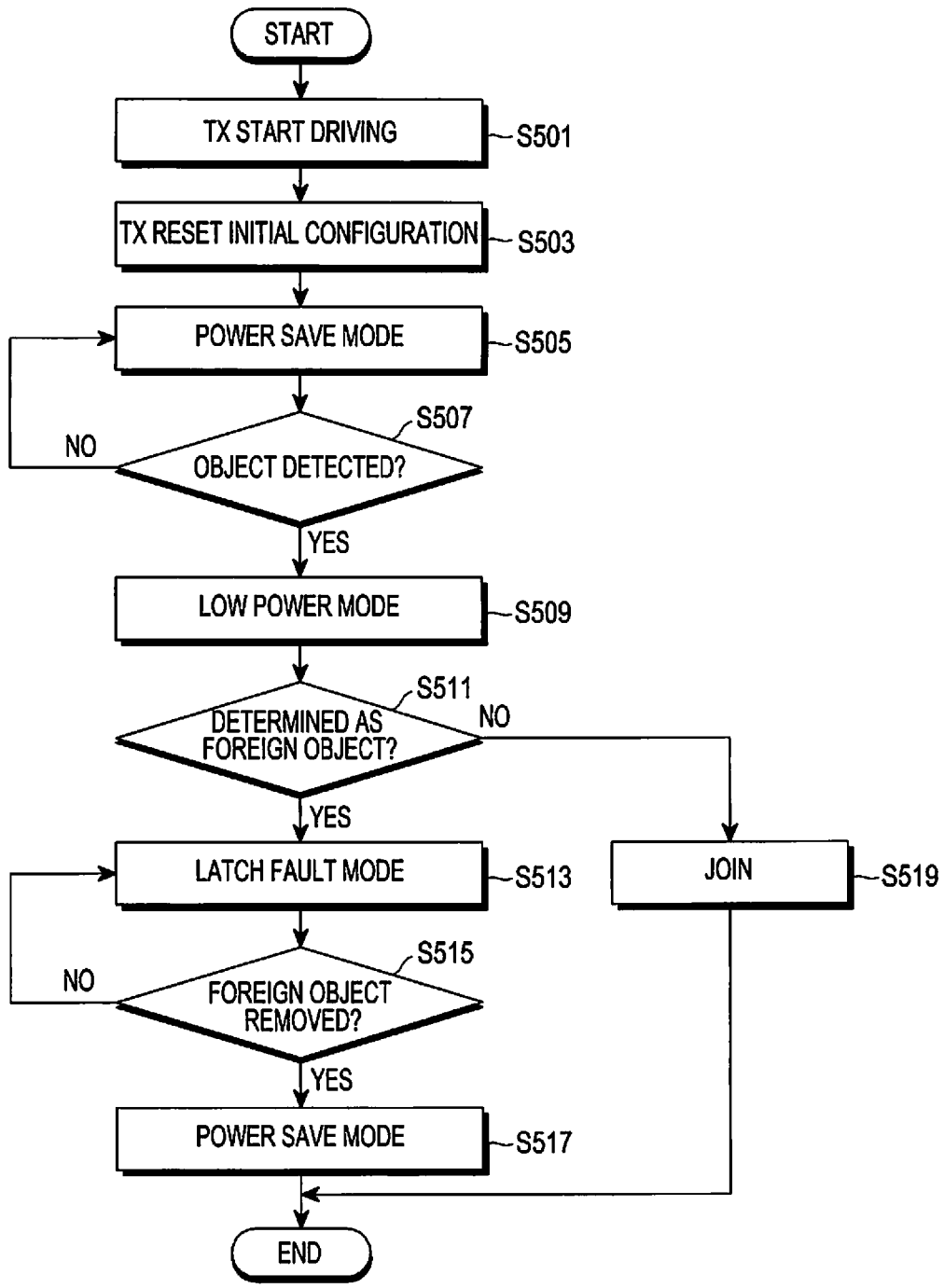
FIG. 5 is a flowchart illustrating operations of a wireless power transmitter and a wireless power receiver according to another embodiment of the present invention.
Figure 6:
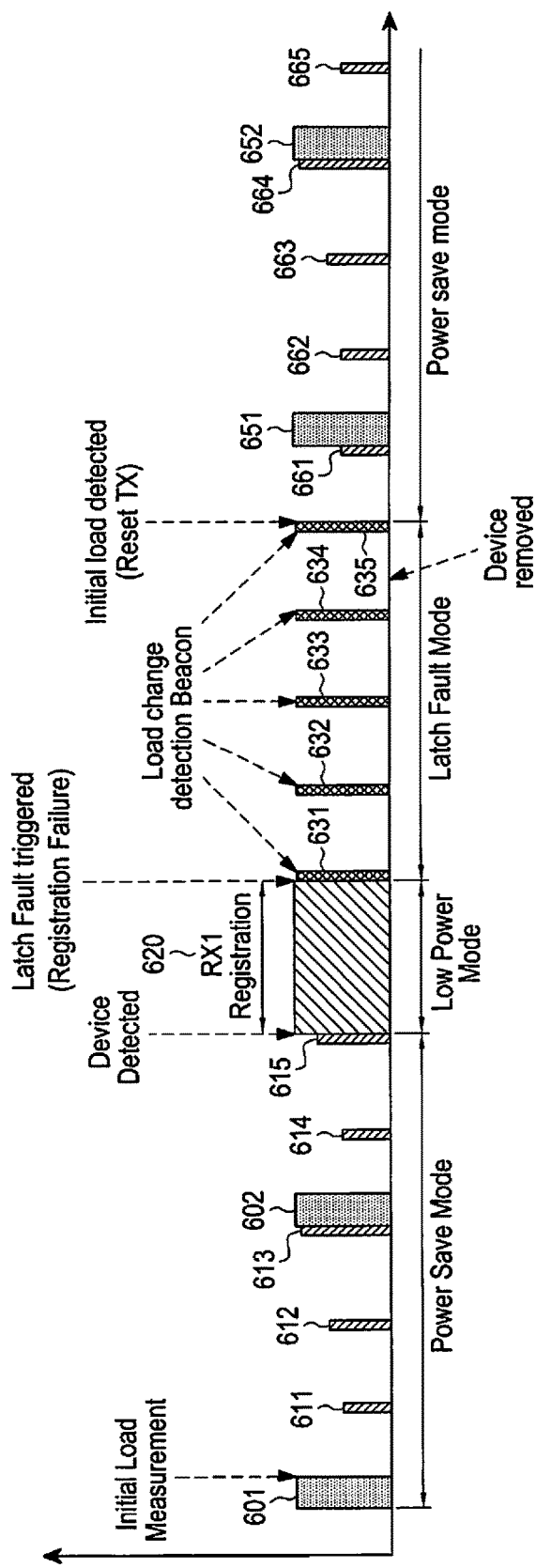
FIG. 6 is a time axis graph for power applied by a wireless power transmitter.

FIG. 5 is a flowchart illustrating operations of a wireless power transmitter and a wireless power receiver according to another embodiment of the present invention. The control method in FIG. 5 will be described in more detail with reference to FIG. 6. FIG. 6 is a time axis graph for power applied by a wireless power transmitter in an embodiment of FIG. 5.

As illustrated in FIG. 5, a wireless power transmitter starts driving in step S501. In addition, the wireless power transmitter resets initial configuration (or initial settings) in step S503. The wireless power transmitter enters the power save mode in step S505. The power save mode corresponds to an interval in which the wireless power transmitter applies powers having different power levels to its power transmitting unit. For example, the power save mode may correspond to an interval in which the wireless power transmitter applies second detection powers 601 and 602 and third detection powers 611, 612, 613, 614 and 615 in FIG. 6, to the power transmitting unit. The wireless power transmitter may periodically apply the second detection powers 601 and 602 at a second cycle, and when applying the second detection powers 601 and 602, the wireless power transmitter may apply the second detection powers 601 and 602 for a second period. The wireless power transmitter may periodically apply the third detection powers 611, 612, 613, 614 and 615 at a third cycle, and when applying the third detection powers 611, 612, 613, 614 and 615, the wireless power transmitter may apply the third detection powers 611, 612, 613, 614 and 615 for a third period. Although a power value for each of the third detection powers 611, 612, 613, 614 and 615 is illustrated as different from each other, the power value for each of the third detection powers 611, 612, 613, 614 and 615 may be different from, or equal to, each other.

For example, after outputting the third detection power 611, the wireless power transmitter may output the third detection power 612 having the same power level. If the wireless power transmitter outputs the third detection power having the same power level, the third detection power may have a power level capable of detecting the lowest-power wireless power receiver (e.g., a wireless power receiver in Category 1).

On the other hand, after outputting the third detection power 611, the wireless power transmitter may output the third detection power 612 having a different power level. If the wireless power transmitter outputs the third detection powers having a different power level, each of the third detection powers may correspond to a power level capable of detecting wireless power receivers in Categories 1 to 5. For example, the third detection power 611 may have a power level capable of detecting a wireless power receiver in Category 1, the third detection power 612 may have a power level capable of detecting a wireless power receiver in Category 3, and the third detection power 613 may have a power level capable of detecting a wireless power receiver in Category 5.

The second detection powers 601 and 602 may be the power that can drive the wireless power receiver. More specifically, the second detection powers 601 and 602 may have a power level capable of driving a controller and a communication unit in the wireless power receiver.

The wireless power transmitter may apply the second detection powers 601 and 602 and the third detection powers 611, 612, 613, 614 and 615 to the power receiving unit at a second cycle and a third cycle, respectively. If the wireless power receiver is placed on the wireless power transmitter, the impedance seen at one point of the wireless power transmitter may be changed. The wireless power transmitter detects the change in impedance while the second detection powers 601 and 602 and the third detection powers 611, 612, 613, 614 and 615 are applied. For example, the wireless power transmitter may detect a change in impedance while applying the third detection power 615. Accordingly, the wireless power transmitter determines if an object is detected in step S507. If no object is detected in step S507, the wireless power transmitter remains in the power save mode, in which the wireless power transmitter periodically applies different powers, in step S505.

On the other hand, if an object is detected due to the change in impedance in step S507, the wireless power transmitter enters the low power mode in step S509. The low power mode is a mode in which the wireless power transmitter applies driving power having a power level capable of driving a controller and a communication unit in the wireless power receiver. For example, in FIG. 6, the wireless power transmitter applies driving power 620 to its power transmitting unit. The wireless power receiver drives its controller and communication unit by receiving the driving power 620. The wireless power receiver performs communication with the wireless power transmitter based on a predetermined scheme using the driving power 620. For example, the wireless power receiver may transmit/receive the data required for authentication, and based thereon, the wireless power receiver may join the wireless power network managed by the wireless power transmitter. However, if a foreign object other than a wireless power receiver is placed on the wireless power transmitter, data transmission/reception is not performed therebetween. Accordingly, the wireless power transmitter determines in step S511 whether the object placed thereon is a foreign object. For example, upon failure to receive a response from the object for a preset time, the wireless power transmitter may determine the object to be a foreign object.

If the object is determined to be a foreign object in step S511, the wireless power transmitter enters the latch fault mode in step S513. On the other hand, if the object is not determined to be a foreign object in step S511, the wireless power transmitter enters a join mode in step S519. For example, the wireless power transmitter may periodically apply first detection powers 631 to 634 in FIG. 6 at a first cycle. The wireless power transmitter determines if a change in impedance is detected while applying the first detection powers. For example, it is determined if the foreign object is removed in step S515, and if so, the wireless power transmitter detects the change in impedance, and the wireless power transmitter determines that the foreign object has been removed. If the foreign object is not removed in step S515, the wireless power transmitter does not detect a change in impedance, and the wireless power transmitter determines that the foreign object has not been removed. If the foreign object has not been removed, the wireless power transmitter may output at least one of lamp light and alert tone, notifying the user that the current status of the wireless power transmitter is an error status. Accordingly, the wireless power transmitter may include an output unit for outputting at least one of the lamp light and the alert tone.

If it is determined that the foreign object has not been removed in step S515, the wireless power transmitter remains in the latch fault mode in step S513. On the other hand, if it is determined that the foreign object has been removed in step S515, the wireless power transmitter re-enters the power save mode in step S517. For example, the wireless power transmitter may apply second detection powers 651 and 652 and third detection powers 661 to 665 in FIG. 6.

As described above, the wireless power transmitter enters the latch fault mode, if a foreign object other than the wireless power receiver is placed thereon. In addition, the wireless power transmitter determines whether the foreign object has been removed, depending on the change in impedance, which is caused by the power applied in the latch fault mode. In other words, the latch fault mode entry conditions in the embodiments of FIGS. 5 and 6 may be the arrangement of the foreign object. The wireless power transmitter may have a variety of latch fault mode entry conditions in addition to the arrangement of the foreign object. For example, the wireless power transmitter may enter the latch fault mode if the wireless power transmitter is cross-connected to the wireless power receiver placed thereon.

Figure 7:
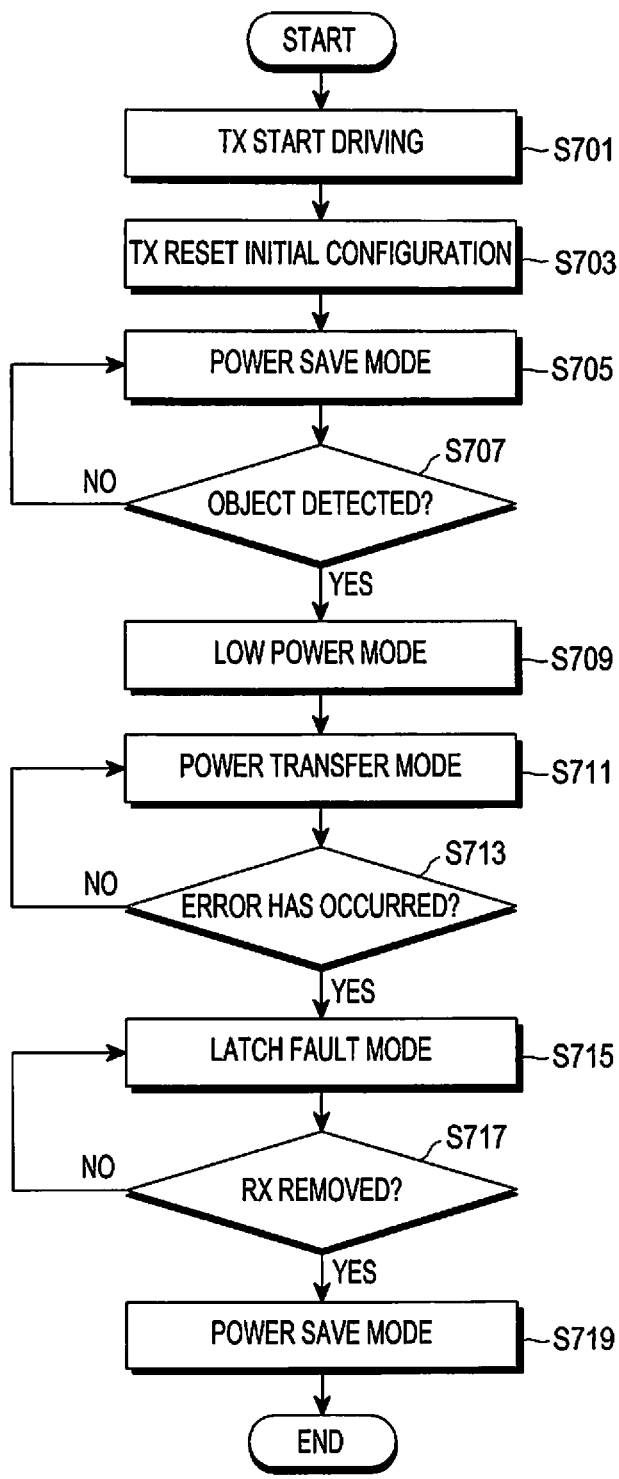
FIG. 7 is a flowchart illustrating a control method of a wireless power transmitter according to an embodiment of the present invention.

Accordingly, upon the occurrence of cross connection, the wireless power transmitter is required to return to the initial status, and removal of the wireless power receiver is required. The wireless power transmitter may set, as latch fault mode entry conditions, the cross connection which occurs if a wireless power receiver placed on another wireless power transmitter joins the wireless power network managed by the wireless power transmitter. Reference will be made to FIG. 7, to describe an operation of a wireless power transmitter, which is performed when an error including cross connection occurs.

Figure 8:
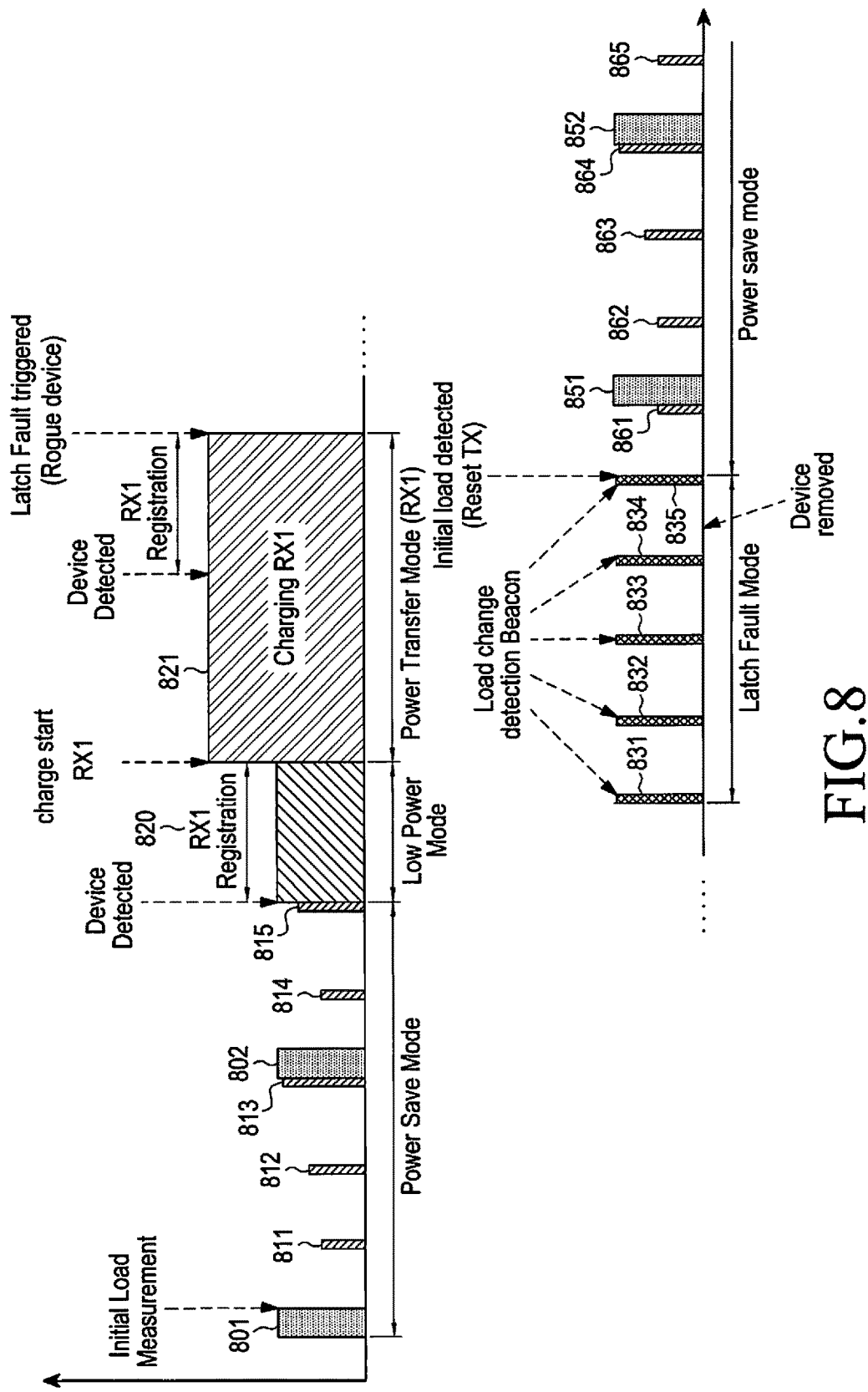
FIG. 8 is a time axis graph for power applied by a wireless power transmitter in an embodiment of FIG. 7.

FIG. 7 is a flowchart illustrating a control method of a wireless power transmitter according to an embodiment of the present invention. The control method in FIG. 7 will be described in more detail with reference to FIG. 8. FIG. 8 is a time axis graph for power applied by a wireless power transmitter in an embodiment of FIG. 7.

As illustrated in FIG. 7, a wireless power transmitter starts driving in step S701. In addition, the wireless power transmitter resets initial configuration (or initial settings) in step S703. The wireless power transmitter enters the power save mode in step S705. The power save mode corresponds to an interval in which the wireless power transmitter applies powers having different power levels to its power transmitting unit. For example, the power save mode may correspond to an interval in which the wireless power transmitter applies second detection powers 801 and 802 and third detection powers 811, 812, 813, 814 and 815 in FIG. 8, to the power transmitting unit. The wireless power transmitter may periodically apply the second detection powers 801 and 802 at a second cycle, and when applying the second detection powers 801 and 802, the wireless power transmitter may apply the second detection powers 801 and 802 for a second period. The wireless power transmitter may periodically apply the third detection powers 811, 812, 813, 814 and 815 at a third cycle, and when applying the third detection powers 811, 812, 813, 814 and 815, the wireless power transmitter may apply the third detection powers 811, 812, 813, 814 and 815 for a third period. Although a power value for each of the third detection powers 811, 812, 813, 814 and 815 is illustrated as different from each other, the power value for each of the third detection powers 811, 812, 813, 814 and 815 may be different from, or equal to, each other.

The second detection powers 801 and 802 may be the power that can drive the wireless power receiver. More specifically, the second detection powers 801 and 802 may have a power level capable of driving a controller and a communication unit in the wireless power receiver.

The wireless power transmitter may apply the second detection powers 801 and 802 and the third detection powers 811, 812, 813, 814 and 815 to the power receiving unit at a second cycle and a third cycle, respectively. If the wireless power receiver is placed on the wireless power transmitter, the impedance seen at one point of the wireless power transmitter may be changed. The wireless power transmitter detects the change in impedance while the second detection powers 801 and 802 and the third detection powers 811, 812, 813, 814 and 815 are applied. For example, the wireless power transmitter may detect a change in impedance while applying the third detection power 815. Accordingly, the wireless power transmitter determines if an object is detected in step S707. If no object is detected in step S707, the wireless power transmitter remains in the power save mode, in which the wireless power transmitter periodically applies different powers, in step S705.

On the other hand, if an object is detected due to the change in impedance in step S707, the wireless power transmitter enters the low power mode in step S709. The low power mode is a mode in which the wireless power transmitter applies driving power having a power level capable of driving a controller and a communication unit in the wireless power receiver. For example, in FIG. 8, the wireless power transmitter applies driving power 820 to its power transmitting unit. The wireless power receiver drives its controller and communication unit by receiving the driving power 820. The wireless power receiver performs communication with the wireless power transmitter based on a predetermined scheme using the driving power 820. For example, the wireless power receiver may transmit/receive the data required for authentication, and based thereon, the wireless power receiver may join the wireless power network managed by the wireless power transmitter.

Thereafter, the wireless power transmitter enters the power transfer mode, in which the wireless power transmitter transmits charging power, in step S711. For example, the wireless power transmitter applies charging power 821 as in FIG. 8, and the charging power is transmitted to the wireless power receiver.

In the power transfer mode, the wireless power transmitter may determine in step S713 whether an error has occurred. Herein, the error may include a foreign object being placed on a wireless power transmitter, cross connection, over voltage, over current, over temperature, and the like. The wireless power transmitter may include a sensing unit capable of measuring the over voltage, over current, over temperature, and the like. For example, the wireless power transmitter may measure a power or a current at a reference point, and if the measured voltage or current exceeds a threshold, the wireless power transmitter may determine that over-voltage or over-current conditions are met. The wireless power transmitter may include a temperature sensing means, and the temperature sensing means may measure the temperature at a reference point of the wireless power transmitter. If the temperature at the reference point exceeds a threshold, the wireless power transmitter may determine that the over-temperature conditions are met.

Although an error, which occurs when a foreign object is additionally placed on the wireless power transmitter, is illustrated in the embodiment of FIG. 8, the error is not limited thereto, and it will be apparent to those of ordinary skill in the art that the wireless power transmitter may operate in a similar process, even upon occurrence of a foreign object being placed on the wireless power transmitter, cross connection, over voltage, over current, over temperature, and the like.

If no error occurs in step S713, the wireless power transmitter remains in the power transfer mode in step S711. On the other hand, if an error has occurred in step S713, the wireless power transmitter enters the latch fault mode in step S715. For example, the wireless power transmitter applies first detection powers 831 to 835 as in FIG. 8. In addition, the wireless power transmitter may output an error indication including at least one of lamp light and alert tone during the latch fault mode. If it is determined in step S717 that the foreign object or wireless power receiver has not been removed, the wireless power transmitter remains in the latch fault mode in step S715. On the contrary, if it is determined in step S717 that the foreign object or wireless power receiver has been removed, the wireless power transmitter re-enters the power save mode in step S719. For example, the wireless power transmitter applies second detection powers 851 and 852 and third detection powers 861 to 865 in FIG. 8.

So far, a description has been made of an operation performed when an error occurs while the wireless power transmitter transmits charging power. A description will now be made of an operation performed when a plurality of wireless power receivers on a wireless power transmitter receive charging power.

Figure 9:
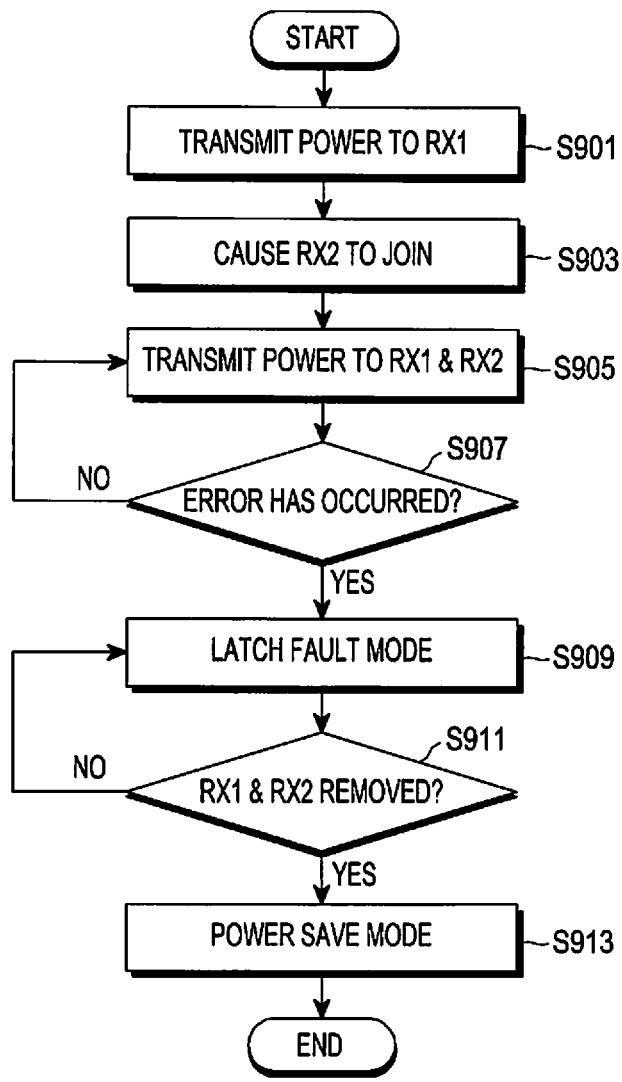
FIG. 9 is a flowchart illustrating a control method of a wireless power transmitter according to an embodiment of the present invention.
Figure 10:
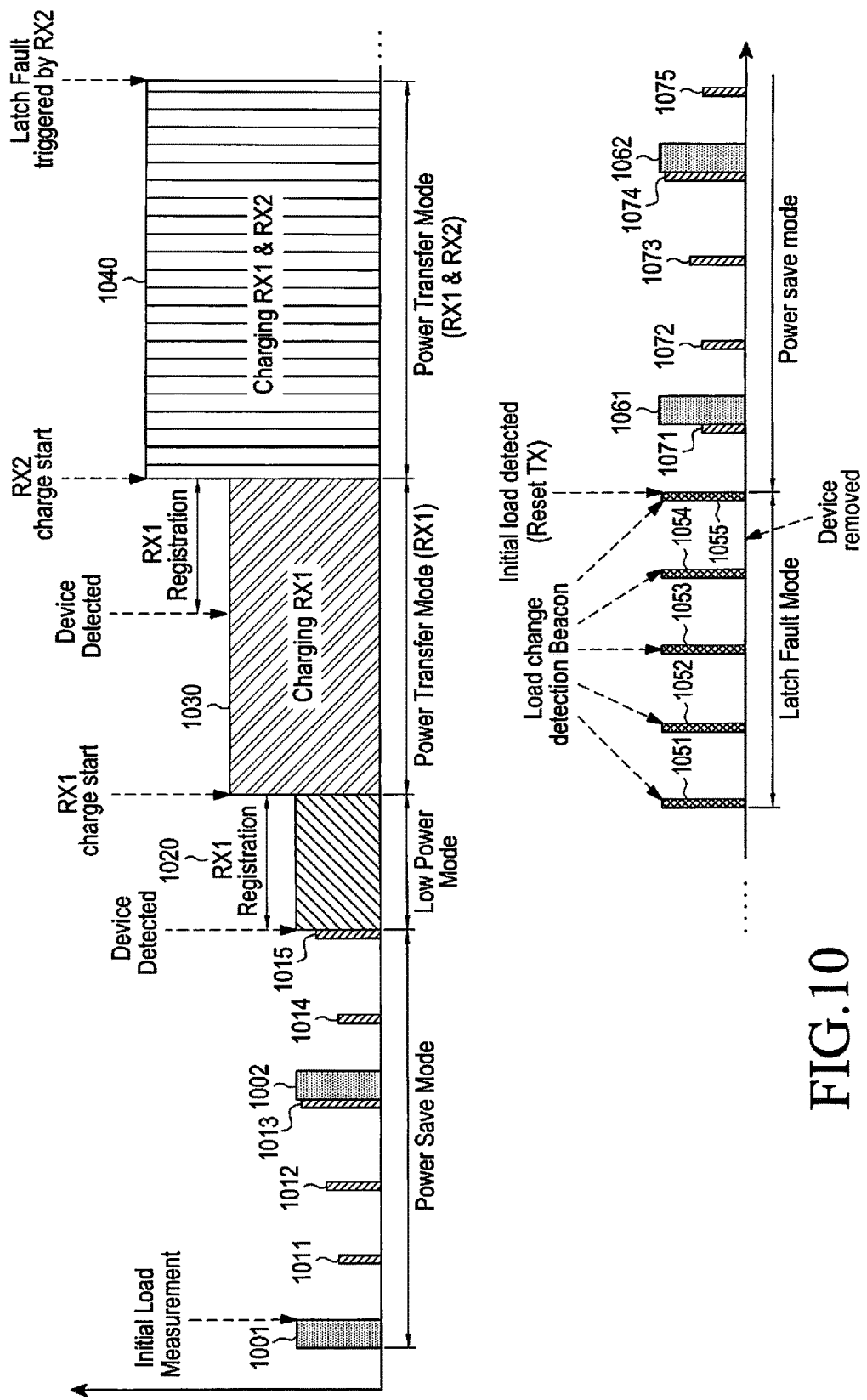
FIG. 10 is a time axis graph for power applied by a wireless power transmitter in an embodiment of FIG. 9.

FIG. 9 is a flowchart illustrating a control method of a wireless power transmitter according to an embodiment of the present invention. The control method in FIG. 9 will be described in more detail with reference to FIG. 10. FIG. 10 is a time axis graph for power applied by a wireless power transmitter in an embodiment of FIG. 9.

As illustrated in FIG. 9, a wireless power transmitter transmits charging power to a first wireless power receiver in step S901. In addition, the wireless power transmitter may additionally cause a second wireless power receiver to join the wireless power network in step S903. The wireless power transmitter also transmits charging power to the second wireless power receiver in step S905. More specifically, the wireless power transmitter applies, to the power receiving units, a sum of the charging power required by the first wireless power receiver and the charging power required by the second wireless power receiver.

An example of steps S901 to S905 is illustrated in FIG. 10. For example, the wireless power transmitter remains in the power save mode in which the wireless power transmitter applies second detection powers 1001 and 1002 and third detection powers 1011 to 1015. Thereafter, upon detecting the first wireless power receiver, the wireless power transmitter enters the low power mode in which the wireless power transmitter maintains detection power 1020. Thereafter, the wireless power transmitter enters the power transfer mode in which the wireless power transmitter applies first charging power 1030. The wireless power transmitter detects the second wireless power receiver, and causes the second wireless power receiver to join the wireless power network. In addition, the wireless power transmitter applies second charging power 1040 that has the total power level of a power level required by the first wireless power receiver and a power level required by the second wireless power receiver.

Referring back to FIG. 9, the wireless power transmitter determines whether an error has occurred in step S907 while transmitting the charging power to both the first and second wireless power receivers in step S905. As described above, the error may include arrangement of a foreign object, cross connection, over voltage, over current, over temperature, and the like. If no error has occurred in step S907, the wireless power transmitter keeps applying the second charging power 1040.

On the other hand, if an error has occurred in step S907, the wireless power transmitter enters the latch fault mode in step S909. For example, the wireless power transmitter applies first detection powers 1051 to 1055 in FIG. 10 at a first cycle. The wireless power transmitter determines in step S911 whether both the first wireless power receiver and the second wireless power receiver have been removed. For example, the wireless power transmitter may detect a change in impedance while applying the first detection powers 1051 to 1055. Based on whether the impedance returns to its initial value, the wireless power transmitter may determine whether both of the first wireless power receiver and the second wireless power receiver have been removed.

If it is determined that both the first wireless power receiver and the second wireless power receiver have been removed in step S911, the wireless power transmitter enters the power save mode in step S913. For example, the wireless power transmitter applies second detection powers 1061 and 1062 and third detection powers 1071 to 1075 in FIG. 10 at a second cycle and a third cycle, respectively.

As described above, even when applying charging power to a plurality of wireless power receivers, the wireless power transmitter may easily determine whether a wireless power receiver or a foreign object has been removed, upon the occurrence of an error.

Figure 11:
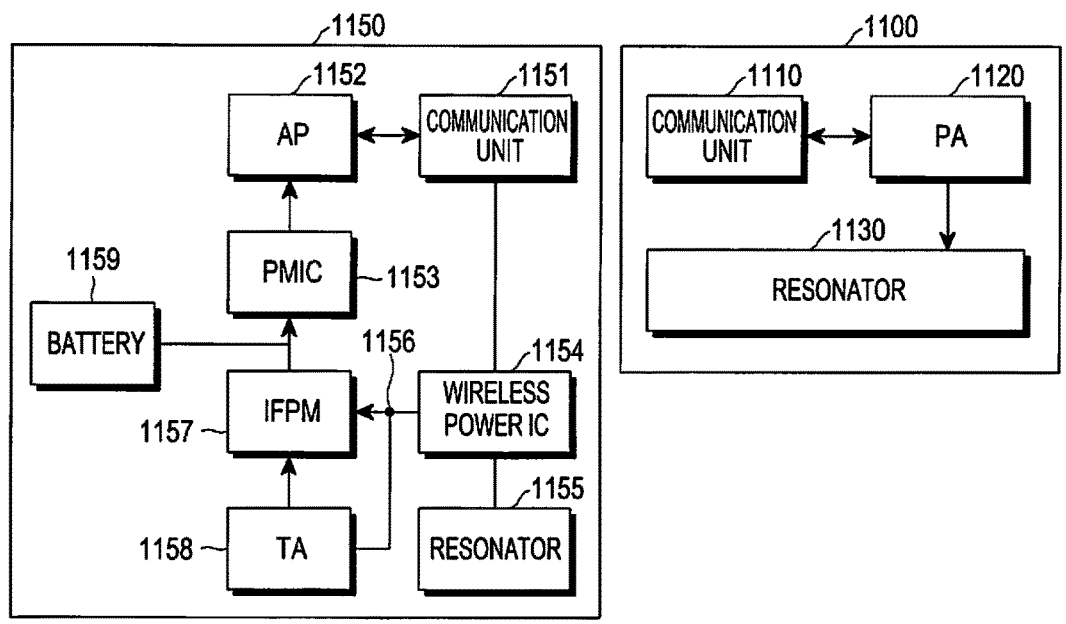
FIG. 11 is a block diagram of a wireless power transmitter and a wireless power receiver according to an embodiment of the present invention.

FIG. 11 is a block diagram of a wireless power transmitter and a wireless power receiver according to an embodiment of the present invention.

A wireless power transmitter 1100 includes a communication unit 1110, a Power Amplifier (PA) 1120 and a resonator 1130. A wireless power receiver 1150 includes a communication unit 1151, an Application Processor (AP) 1152, a Power Management Integrated Circuit (PMIC) 1153, a Wireless Power Integrated Circuit (WPIC) 1154, a resonator 1155, an Interface Power Management IC (IFPM) 1157, a wired charging adapter (also known as a Travel Adapter (TA)) 1158, and a battery 1159.

The communication unit 1110 performs communication with the communication unit 1151 based on a predetermined scheme (e.g., BLE scheme). For example, the communication unit 1151 in the wireless power receiver 1150 may transmit a PRU Dynamic signal having the data structure of Table 3 to the communication unit 1110 in the wireless power transmitter 1100. As described above, the PRU Dynamic signal may include at least one of voltage information, current information, temperature information and alert information of the wireless power receiver 1150.

Based on the received PRU Dynamic signal, an output power value from the power amplifier 1120 may be adjusted. For example, if over voltage, over current or over temperature is applied to the wireless power receiver 1150, a power value output from the power amplifier 1120 is reduced. In addition, if the voltage or current of the wireless power receiver 1150 is less than a preset value, the power value output from the power amplifier 1120 is increased.

The charging power from the resonator 1130 may be wirelessly transmitted to the resonator 1155.

The wireless power integrated circuit 1154 rectifies the charging power received from the resonator 1155, and performs DC/DC conversion on the rectified charging power. The wireless power integrated circuit 1154 drives the communication unit 1151 with the converted power, or charges the battery 1159 with the converted power.

A wired charging terminal may be inserted in the wired charging adapter (TA) 1158. In the wired charging adapter 1158 may be inserted a wired charging terminal such as a 30-pin connector, a Universal Serial Bus (USB) connector or the like. The wired charging adapter 1158 receives power supplied from an external power source, and charges the battery 1159 with the received power.

The IFPM 1157 processes the power received from the wired charging terminal, and outputs the processed power to the battery 1159 and the PMIC 1153.

The PMIC 1153 manages the power received wirelessly or by wire, and the power applied to each of the components of the wireless power receiver 1150. The AP 1152 receives power information from the PMIC 1153, and controls the communication unit 1151 to transmit a PRU Dynamic signal for reporting the received power information.

A node 1156 connected to the WPIC 1154 is also connected to the wired charging adapter 1158. If a wired charging connector (or a wired charging terminal) is inserted in the wired charging adapter 1158, a preset voltage (e.g., 5V) may be applied to the node 1156. The WPIC 1154 monitors a voltage applied to the node 1156, to determine whether the wired charging adapter 1158 is inserted.

As described above, the wireless power receiver 1150 performs communication with the wireless power transmitter 1100. For example, the wireless power receiver 1150 may use an Attribute Protocol protocol stack in the BLE scheme. ATT refers to a protocol that classifies terminals into a server and a client and defines transmission of data between the server and the client. In order to transmit data, the client should recognize the handle values assigned to each communication packet. These handle values may be determined by the server, and servers may define different handle values for same type of the communication packet. If a communication connection is formed between a server and a client, the client may obtain a handle value by requesting the handle value from the server. In addition, the client may exchange communication packets such as Read, Write or the like, with the server.

Figure 12:
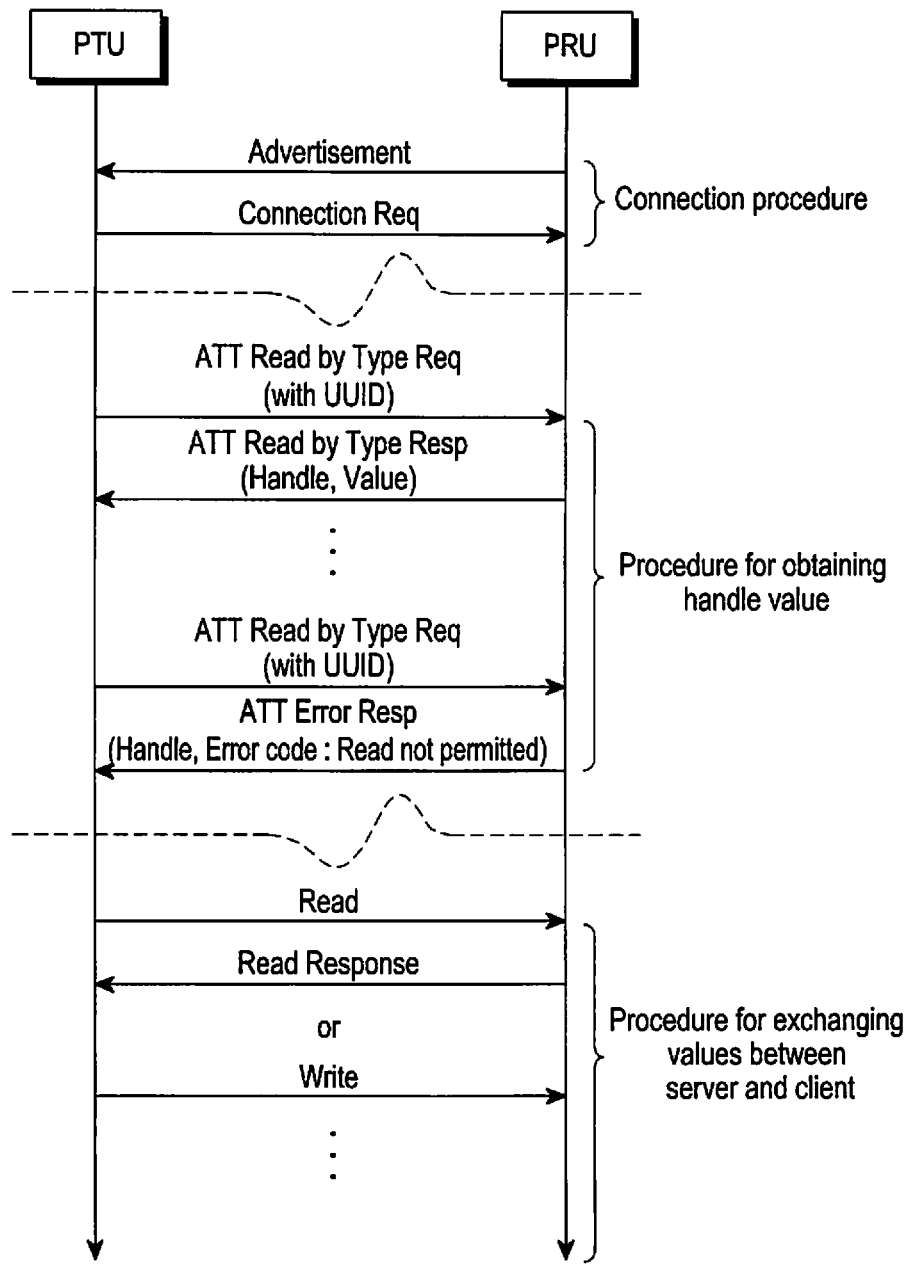
FIGS. 12 and 13 illustrate examples for comparison with the present invention.
Figure 13:
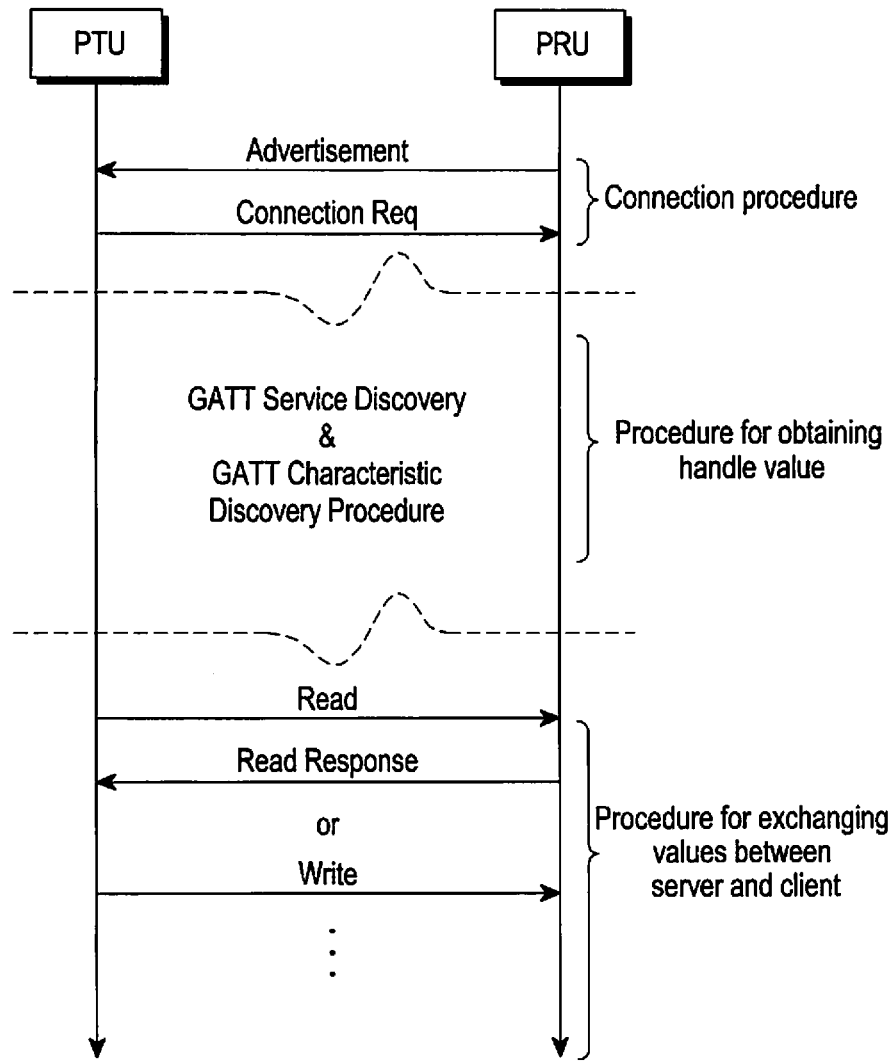

FIGS. 12 and 13 illustrate examples for comparison with the present invention.

Referring to FIG. 12, in a connection procedure, a wireless power transmitter PTU and a wireless power receiver PRU exchange an advertisement signal and a connection request signal with each other. By the exchange of signals, the wireless power transmitter PTU and the wireless power receiver PRU form a communication connection therebetween.

The wireless power transmitter PTU transmits an 'ATT Read by Type Req' signal to the wireless power receiver PRU. The 'ATT Read by Type Req' signal may include a Universally Unique Identifier (UUID) that is predefined in the BLE scheme. In response, the wireless power receiver PRU transmits an 'ATT Read by Type Resp' signal to the wireless power transmitter PTU. The 'ATT Read by Type Resp' signal may include information about a handle value. Based on the transmission/reception of the 'ATT Read by Type Req' signal and the 'ATT Read by Type Resp' signal, the wireless power transmitter PTU obtains a handle value for one signal.

In the handle value obtaining method in FIG. 13, the wireless power transmitter PTU and the wireless power receiver PRU first form a communication connection.

Once the communication connection is formed, the wireless power transmitter PTU and the wireless power receiver PRU exchange handle values with each other by the Generic Attribute Protocol Service discovery and GATT characteristic Discovery Procedure defined in the BLE scheme.

In the examples of FIGS. 12 and 13, even after the communication connection is formed, the wireless power transmitter PTU obtains handle values for a predetermined time, causing a delay in communication.

Figure 14:
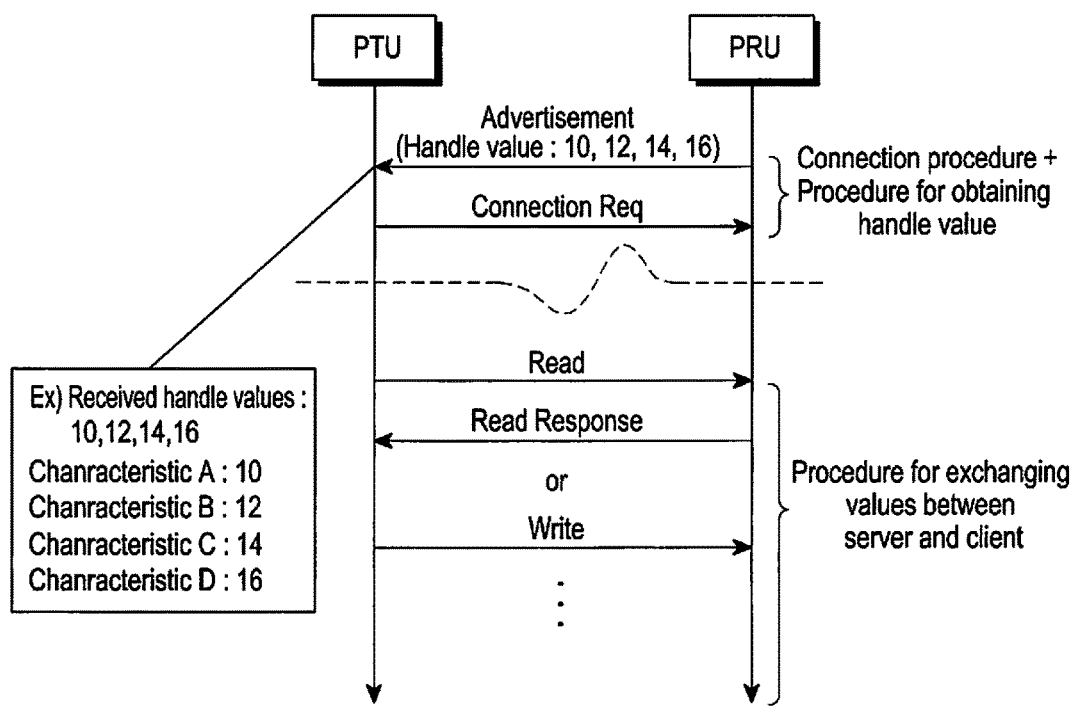
FIGS. 14 to 17 are flow diagrams illustrating transmission/reception of handle values of a wireless power transmitter and a wireless power receiver according to various embodiments of the present invention.

FIG. 14 is a flow diagram illustrating exchange of handle values by a wireless power transmitter and a wireless power receiver according to an embodiment of the present invention.

The wireless power receiver PRU in the example of FIG. 14, in contrast to the examples of FIGS. 12 and 13, transmits and receives handle values in the process of forming a communication connection. As illustrated in FIG. 14, the wireless power receiver PRU transmits an advertisement signal to the wireless power transmitter PTU. The advertisement signal may include information about a handle value for a preset UUID. For example, the advertisement signal may include handle value information for assigning a handle value of 10 to a characteristic A, a handle value of 12 to a characteristic B, a handle value of 14 to a characteristic C, and a handle value of 16 to a characteristic D. The handle value, which is a value for identifying a signal in a predetermined communication scheme, may be referred to as a signal identifier in the communication scheme.

The wireless power transmitter PTU receives the advertisement signal, and obtains handle value information included in the advertisement signal. The wireless power transmitter PTU transmits a connection request signal, and the wireless power transmitter PTU and the wireless power receiver PRU form a communication connection. In particular, the wireless power transmitter PTU obtains handle value information in the process of forming a communication connection.

Thereafter, the wireless power transmitter PTU transmits and receives a Read signal, a Read Response signal, or a Write signal. Based on the obtained handle value information, the wireless power transmitter PTU performs the transmission/reception of the Read signal, Read Response signal, or Write signal.

Figure 15:
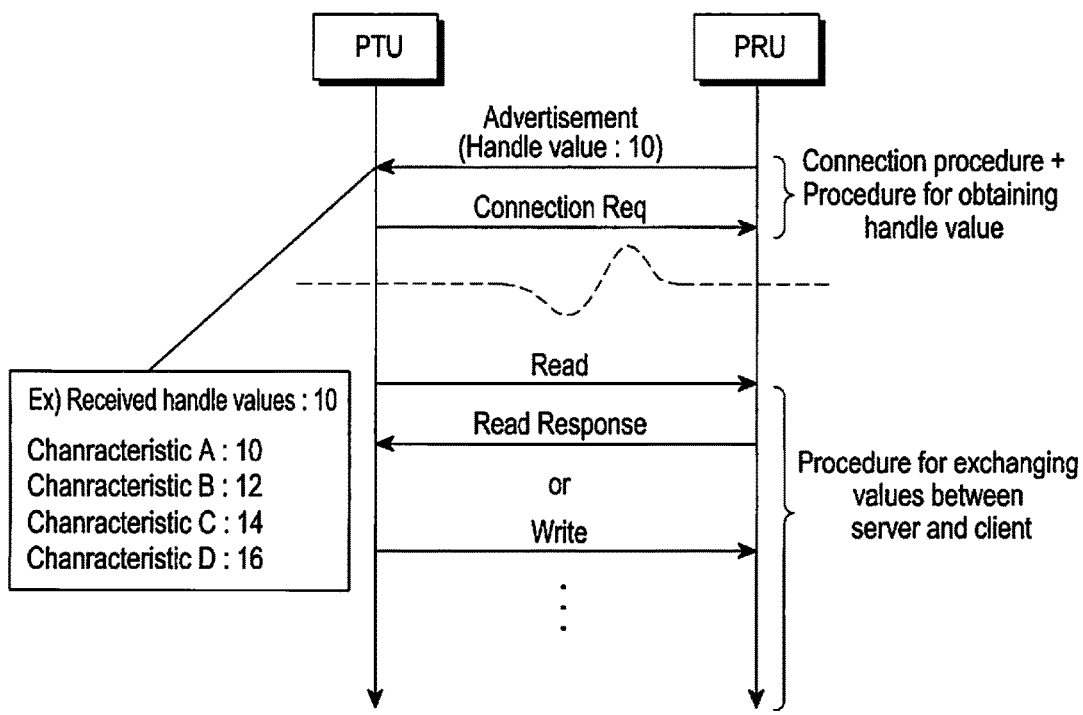

FIG. 15 is a flow diagram illustrating exchange of handle values by a wireless power transmitter and a wireless power receiver according to an embodiment of the present invention.

The wireless power receiver PRU in the example of FIG. 15 transmits and receives handle values in the process of forming a communication connection. As illustrated in FIG. 15, the wireless power receiver PRU transmits an advertisement signal to the wireless power transmitter PTU. The advertisement signal includes handle value information for a preset UUID. For example, the advertisement signal may include handle value information for assigning a handle value of 10 to a characteristic A.

The wireless power transmitter PTU receives the advertisement signal, and obtains handle value information included in the advertisement signal. The wireless power transmitter PTU may assign a handle value to a UUID based on the received handle value and the pre-stored computation rule. For example, the wireless power transmitter PTU may receive, from the wireless power receiver PRU, handle value information indicating that a handle value of a characteristic A is 10. The wireless power transmitter PTU may pre-store the computation rule of sequentially assigning a handle value to characteristics of A to D by adding two (2) thereto. Accordingly, the wireless power transmitter PTU may assign a handle value of 12 to a characteristic B, a handle value of 14 to a characteristic C and a handle value of 16 to a characteristic D.

The wireless power transmitter PTU transmits a connection request signal, and the wireless power transmitter PTU and the wireless power receiver PRU form a communication connection therebetween. In particular, the wireless power transmitter PTU obtains handle value information in the process of forming a communication connection.

Thereafter, the wireless power transmitter PTU transmits and receives a Read signal, a Read Response signal, or a Write signal. Based on the obtained handle value information, the wireless power transmitter PTU performs the transmission/reception of the Read signal, Read Response signal, or Write signal.

Figure 16:
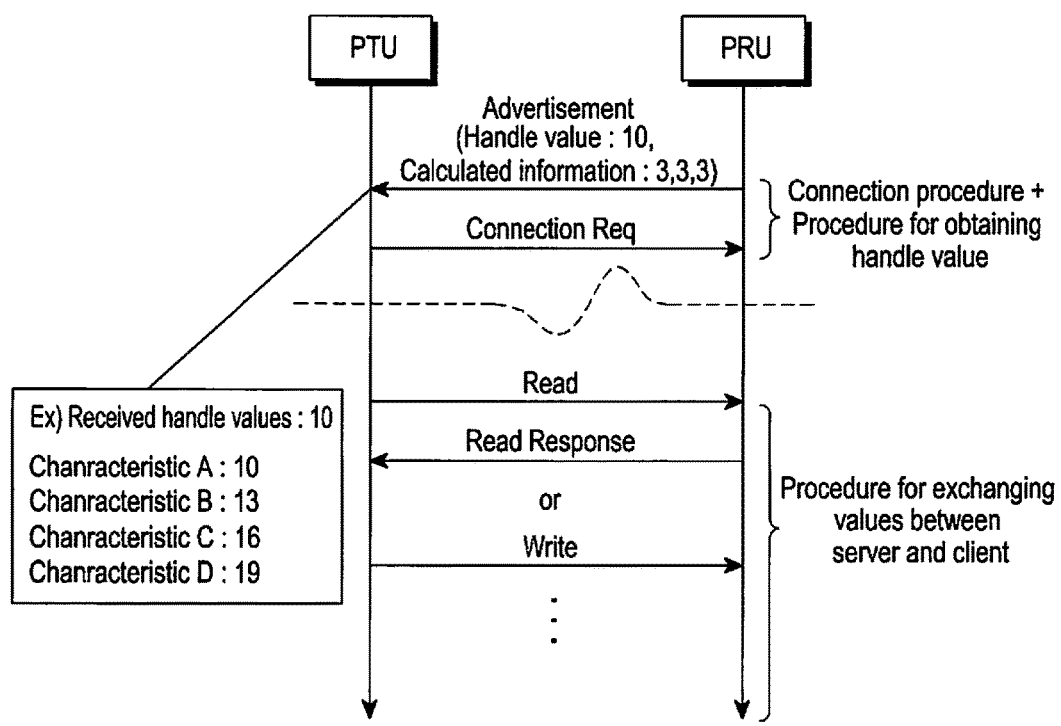

FIG. 16 is a flow diagram illustrating exchange of handle values by a wireless power transmitter and a wireless power receiver according to an embodiment of the present invention.

The wireless power receiver PRU in the example of FIG. 16 transmits and receives handle values in the process of forming a communication connection. As illustrated in FIG. 16, the wireless power receiver PRU transmits an advertisement signal to the wireless power transmitter PTU. The advertisement signal includes handle value information for a preset UUID. For example, the advertisement signal may include handle value information indicating that differences between a handle value of 10, which is assigned to an initial characteristic A, and handle values assigned to its subsequent characteristics are 3, 3 and 3.

The wireless power transmitter PTU receives the advertisement signal, and obtains handle value information included in the advertisement signal. The wireless power transmitter PTU determines information about differences between a handle value for an initial characteristic and handle values of the subsequent characteristics. The wireless power transmitter PTU assigns handle values to the UUID based on the information about the differences between the handle value for the initial characteristic and the handle values of the subsequent characteristics.

For example, the wireless power transmitter PTU may receive, from the wireless power receiver PRU, handle value information indicating that a handle value of the characteristic A is 10, and handle value difference information indicating that differences between the handle value of the characteristic A and the handle values of its subsequent characteristics are 3, 3 and 3. The wireless power transmitter PTU assigns handle values to characteristics of A to D by sequentially applying handle value differences of 3, 3 and 3. Accordingly, the wireless power transmitter PTU may assign a handle value of 13 to the characteristic B, a handle value of 16 to the characteristic C, and a handle value of 19 to the characteristic D.

The wireless power transmitter PTU transmits a connection request signal, and the wireless power transmitter PTU and the wireless power receiver PRU form a communication connection therebetween. In particular, the wireless power transmitter PTU obtains handle value information in the process of forming a communication connection.

Thereafter, the wireless power transmitter PTU transmits and receives a Read signal, a Read Response signal, or a Write signal. Based on the obtained handle value information, the wireless power transmitter PTU performs the transmission/reception of the Read signal, Read Response signal, or Write signal.

Figure 17:
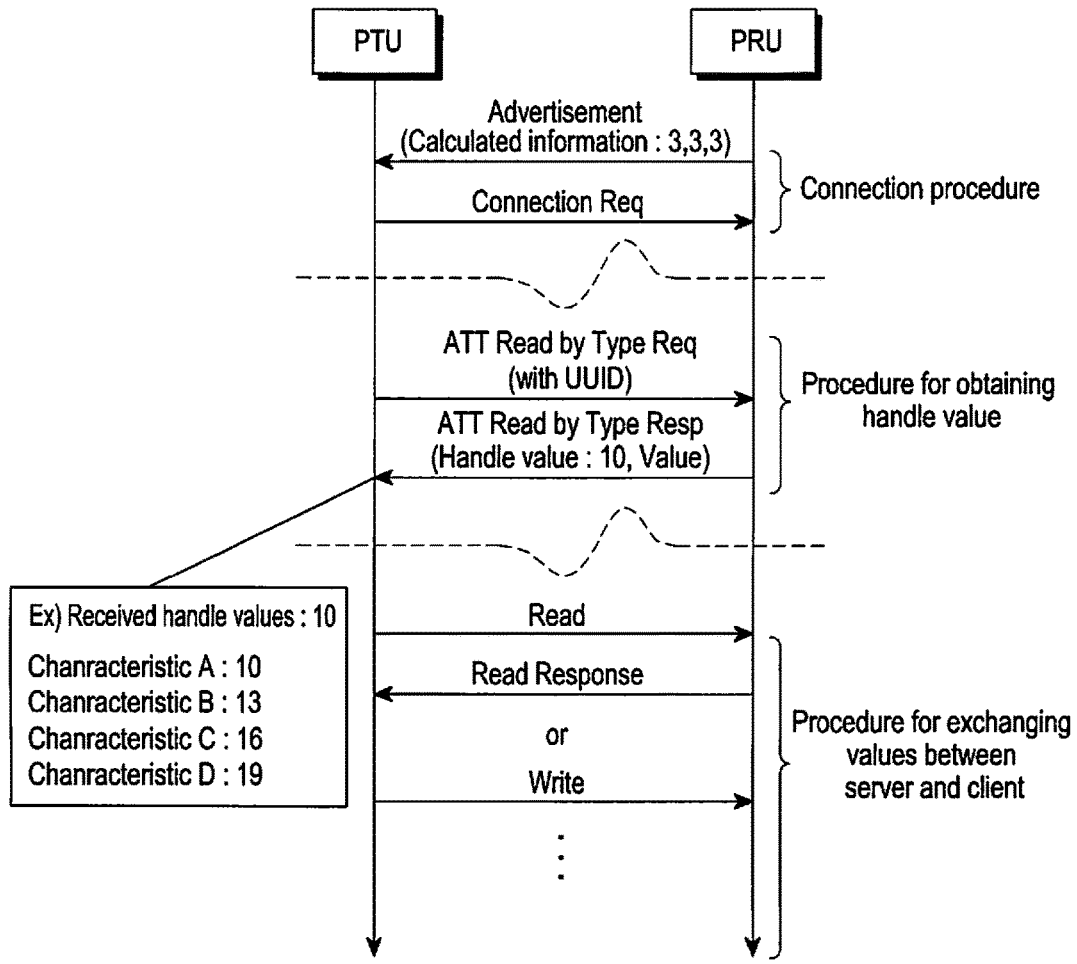

FIG. 17 is a flow diagram illustrating exchange of handle values by a wireless power transmitter and a wireless power receiver according to an embodiment of the present invention.

The wireless power receiver PRU in the example of FIG. 17 transmits and receives handle values in the process of forming a communication connection. As illustrated in FIG. 17, the wireless power receiver PRU transmits an advertisement signal to the wireless power transmitter PTU. The advertisement signal may include information, based on which a handle value can be calculated. For example, the advertisement signal in the example of FIG. 17 may include handle value difference information instructing to sequentially applying handle value differences of 3, 3 and 3 to the characteristics following the initial characteristic.

The wireless power transmitter PTU receives and stores the information based on which a handle value can be calculated, and transmits a connection request signal to the wireless power receiver PRU. Accordingly, the wireless power transmitter PTU and the wireless power receiver PRU form a communication connection. Once the communication connection is formed, the wireless power receiver PRU receives an 'ATT Read by Type Req' signal from the wireless power transmitter PTU. In response, the wireless power receiver PRU transmits an 'ATT Read by Type Resp' signal to the wireless power transmitter PTU. The 'ATT Read by Type Resp' signal may include handle value information of the initial characteristic. For example, in the example of FIG. 17, the 'ATT Read by Type Resp' signal may include handle value information for the initial characteristic, indicating that the handle value of the characteristic A is 10.

The wireless power transmitter PTU determines handle values for the other characteristics based on the handle value information for the initial characteristic, which is received by the 'ATT Read by Type Resp' signal, and the information based on which a handle value can be calculated, which is received in the process of forming a communication connection.

For example, the wireless power transmitter PTU may receive, from the wireless power receiver PRU, handle value information indicating that the handle value of the characteristic A is 10, and based on the handle value difference information indicating that differences between the initial characteristic A and its subsequent characteristics are 3, 3 and 3, the wireless power transmitter PTU assigns handle values by sequentially applying handle difference values of 3, 3 and 3 to the characteristics of A to D. Accordingly, the wireless power transmitter PTU may assign a handle value of 13 to the characteristic B, a handle value of 16 to the characteristic C, and a handle value of 19 to the characteristic D.

The wireless power transmitter PTU transmits a connection request signal, and the wireless power transmitter PTU and the wireless power receiver PRU form a communication connection therebetween. In particular, the wireless power transmitter PTU obtains handle value information in the process of forming a communication connection.

Thereafter, the wireless power transmitter PTU transmits and receives a Read signal, a Read Response signal, or a Write signal. Based on the obtained handle value information, the wireless power transmitter PTU performs the transmission/reception of the Read signal, Read Response signal, or Write signal. The handle value difference information is merely illustrative, and may be changed to handle value pattern information.

As is apparent from the foregoing description, according to various embodiments of the present invention, the wireless power transmitter may receive a stack that is based on a predetermined communication scheme, from the wireless power receiver.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A control method for transmitting charging power to a wireless power receiver in a wireless power transmitter, the control method comprising:
applying beacon power for detecting the wireless power receiver into a resonator of the wireless power transmitter;
in response to detecting a change of a load impedance of the resonator while applying the beacon power, applying driving power into the resonator, wherein the wireless power receiver transmits an advertisement signal to the wireless power transmitter by using at least part of the driving power wirelessly received from the wireless power transmitter;
receiving the advertisement signal from the wireless power receiver, the advertisement signal including a handle value for a preset universally unique identifier (UUID);
obtaining information about a characteristic of the advertisement signal, wherein the handle value is assigned to the characteristic;
transmitting a connection request signal to the wireless power receiver for forming a communication connection between the wireless power transmitter and the wireless power receiver, based on the information;
registering the wireless power receiver to a wireless power network corresponding to the wireless power transmitter through the communication connection; and
transmitting wireless charging power to the wireless power receiver after registering the wireless power receiver.

2. The control method of claim 1, wherein the handle value indicates at least one characteristic of the UUID.

3. The control method of claim 2, wherein transmitting the connection request signal comprises performing at least one of transmission of a read signal to the wireless power receiver, reception of a read response signal from the wireless power receiver, and transmission of a write signal to the wireless power receiver, based on the handle value for the at least one characteristic of the UUID.

4. The control method of claim 2, further comprising:
sequentially determining handle values of other characteristics of the UUID based on the handle value for the at least one characteristic of the UUID.

5. The control method of claim 2, further comprising:
sequentially determining handle values of other characteristics of the UUID based on the handle value for the at least one characteristic of the UUID and a pre-stored computation rule.

6. The control method of claim 1, wherein the preset UUID includes a wireless power transfer service.

7. The control method of claim 1, further comprising:
forming a communication connection with the wireless power receiver.

8. A control method for receiving charging power from a wireless power transmitter in a wireless power receiver, the control method comprising:
receiving driving power into a resonator of the wireless power receiver, wherein the wireless power receiver transmits an advertisement signal to the wireless power transmitter by using at least part of the driving power wirelessly received from the wireless power transmitter;
transmitting the advertisement signal to the wireless power transmitter, the advertisement signal including a handle value related to a preset universally unique identifier (UUID) for the wireless power transmitter;
obtaining information about a characteristic of the advertisement signal, wherein the handle value is assigned to the characteristic;
receiving a communication connection request signal from the wireless power transmitter;
forming a communication connection between the wireless power transmitter and the wireless power receiver, based on the communication connection request signal;
joining a wireless power network corresponding to the wireless power transmitter through the communication connection; and
receiving wireless charging power from the wireless power transmitter after joining the wireless power network.

9. The control method of claim 8, wherein the handle value indicates at least one characteristic of the UUID.

10. The control method of claim 9, wherein receiving the communication connection request signal comprises performing at least one of reception of a read signal from the wireless power transmitter, transmission of a read response signal to the wireless power transmitter, and reception of a write signal from the wireless power transmitter, based on the handle value for the at least one characteristic of the UUID.

11. The control method of claim 9, wherein handle values of other characteristics of the UUID are sequentially determined based on the handle value for the at least one characteristic of the UUID.

12. The control method of claim 8, wherein the preset UUID includes a wireless power transfer service.

13. A wireless power transmitter for transmitting charging power to a wireless power receiver, the wireless power transmitter comprising:
a communication unit; and
a controller configured to:
apply beacon power for detecting the wireless power receiver into a resonator of the wireless power transmitter,
in response to detecting a change of a load impedance of the resonator while applying the beacon power, apply driving power into the resonator, wherein the wireless power receiver transmits an advertisement signal to the wireless power transmitter by using at least part of the driving power wirelessly received from the wireless power transmitter,
receive, using the communication unit, the advertisement signal from the wireless power receiver, the advertisement signal including a handle value for a preset universally unique identifier (UUID),
obtain information about a characteristic of the advertisement signal, wherein the handle value is assigned to the characteristic,
transmit, using the communication unit, a connection request signal to the wireless power receiver for forming a communication connection between the wireless power transmitter and the wireless power receiver, based on the information, register the wireless power receiver to a wireless power network corresponding to the wireless power transmitter through the communication connection, and transmit wireless charging power to the wireless power receiver after registering the wireless power receiver.

14. The wireless power transmitter of claim 13, wherein the handle value indicates at least one characteristic of the UUID.

15. The wireless power transmitter of claim 14, wherein the controller is further configured to perform at least one of transmission of a read signal to the wireless power receiver, reception of a read response signal from the wireless power receiver, and transmission of a write signal to the wireless power receiver, based on the handle value for the at least one characteristic of the UUID.

16. The wireless power transmitter of claim 14, wherein the controller is further configured to sequentially determine handle values of other characteristics of the UUID based on the handle value for the at least one characteristic of the UUID.

17. The wireless power transmitter of claim 14, wherein the controller is further configured to sequentially determine handle values of other characteristics of the UUID based on the handle value for the at least one characteristic of the UUID and a pre-stored computation rule.

18. The wireless power transmitter of claim 13, wherein the controller is further configured to form a communication connection with the wireless power receiver.

19. The wireless power transmitter of claim 13, wherein the preset UUID includes a wireless power transfer service.

20. A wireless power receiver for receiving charging power from a wireless power transmitter, wireless power receiver comprising:

a communication unit; and a controller configured to:

receive driving power into a resonator of the wireless power receiver, wherein the wireless power receiver transmits an advertisement signal to the wireless power transmitter by using at least part of the driving power wirelessly received from the wireless power transmitter, transmit, using the communication unit, the advertisement signal to the wireless power transmitter, the advertisement signal including a handle value related to a preset universally unique identifier (UUID) for the wireless power transmitter, obtain information about a characteristic of the advertisement signal, wherein the handle value is assigned to the characteristic, receive, using the communication unit, a communication connection request signal from the wireless power transmitter, form a communication connection between the wireless power transmitter and the wireless power receiver, based on the communication connection request signal, join a wireless power network corresponding to the wireless power transmitter through the communication connection, and receive wireless charging power from the wireless power transmitter after joining the wireless power network.

21. The wireless power receiver of claim 20, wherein the handle value indicates at least one characteristic of the UUID.

22. The wireless power receiver of claim 21, wherein the controller is further configured to perform at least one of reception of a read signal from the wireless power transmitter, transmission of a read response signal to the wireless power transmitter, and reception of a write signal from the wireless power transmitter, based on the handle value for the at least one characteristic of the UUID.

23. The wireless power receiver of claim 21, wherein the handle values of other characteristics of the UUID are sequentially determined based on the handle value for the at least one characteristic of the UUID.

24. The wireless power receiver of claim 20, wherein the preset UUID includes a wireless power transfer service.

\* \* \* \* \*